(12) United States Patent
Jeong et al.

(10) Patent No.: US 10,696,281 B2
(45) Date of Patent: Jun. 30, 2020

(54) ELECTRIC BRAKE SYSTEM AND OPERATING METHOD THEREOF

(71) Applicant: MANDO CORPORATION, Gyeonggi-do (KR)

(72) Inventors: Hyojin Jeong, Gyeonggi-do (KR); Seong Ho Choi, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/138,914

(22) Filed: Sep. 21, 2018

(65) Prior Publication Data
US 2019/0092300 A1    Mar. 28, 2019

(30) Foreign Application Priority Data

Sep. 25, 2017 (KR) .................. 10-2017-0123547
Sep. 29, 2017 (KR) .................. 10-2017-0127467

(51) Int. Cl.
*B60T 13/68* (2006.01)
*B60T 8/40* (2006.01)
(Continued)

(52) U.S. Cl.
CPC ............. *B60T 13/686* (2013.01); *B60T 8/17* (2013.01); *B60T 8/341* (2013.01); *B60T 8/409* (2013.01);
(Continued)

(58) Field of Classification Search
CPC ...... B60T 13/686; B60T 13/165; B60T 13/58; B60T 8/409; B60T 8/17; B60T 8/341;
(Continued)

(56) References Cited

U.S. PATENT DOCUMENTS

2012/0169112 A1    7/2012  Jungbecker et al.
2017/0144642 A1*   5/2017  Kim ..................... B60T 7/042
(Continued)

FOREIGN PATENT DOCUMENTS

EP    2 520 473    11/2012
JP    2006-7874    1/2006
(Continued)

OTHER PUBLICATIONS

Extended European Search Report dated Dec. 14, 2018 for European Patent Application No. 18196618.5.
(Continued)

*Primary Examiner* — Vishal R Sahni
(74) *Attorney, Agent, or Firm* — Ladas & Parry, LLP

(57) ABSTRACT

Disclosed herein are an electric brake system and an operating method thereof. The electric bake system includes a master cylinder discharging pressure medium according to a displacement of a brake pedal, a simulator providing a sense of pedal to a driver, a hydraulic supplier generating hydraulic pressure by operating a hydraulic piston in response to an electrical signal output by corresponding to the displacement of the brake pedal, and a hydraulic control unit controlling hydraulic pressure of the pressure medium supplied to each wheel cylinder. The electric brake system performs a normal operation mode having a low pressure mode and a high pressure mode, an abnormal operation mode and an inspection mode.

20 Claims, 15 Drawing Sheets

(51) Int. Cl.
*B60T 8/17* (2006.01)
*B60T 8/34* (2006.01)
*B60T 13/16* (2006.01)
*B60T 13/58* (2006.01)
*B60T 15/02* (2006.01)
*B60T 17/22* (2006.01)

(52) U.S. Cl.
CPC .......... *B60T 8/4081* (2013.01); *B60T 13/165* (2013.01); *B60T 13/58* (2013.01); *B60T 15/028* (2013.01); *B60T 17/221* (2013.01); *B60T 2270/10* (2013.01); *B60T 2270/402* (2013.01); *B60T 2270/404* (2013.01); *B60T 2270/406* (2013.01); *B60T 2270/82* (2013.01)

(58) Field of Classification Search
CPC ................. B60T 17/221; B60T 15/028; B60T 2270/406; B60T 2270/402; B60T 2270/404; B60T 2270/10; B60T 2270/82
See application file for complete search history.

(56) References Cited

U.S. PATENT DOCUMENTS

2017/0144643 A1* 5/2017 Kim .................... B60T 7/042
2017/0144644 A1* 5/2017 Kim .................... B60T 13/146
2017/0158180 A1* 6/2017 Kim .................... B60T 7/042
2019/0092295 A1 3/2019 Jeong et al.
2019/0092301 A1 3/2019 Jeong et al.
2019/0092302 A1 3/2019 Jeong et al.

FOREIGN PATENT DOCUMENTS

| KR | 10-2013-0130710 | 12/2013 |
| KR | 10-2014-0006041 | 1/2014 |
| KR | 10-2015-0028331 | 3/2015 |
| KR | 10-2016-0088382 | 7/2016 |
| KR | 10-2016-0134833 | 11/2016 |
| WO | 2016/087506 | 6/2016 |

OTHER PUBLICATIONS

Extended European Search Report dated Dec. 13, 2018 for European Patent Application No. 18196611.0.
Extended European Search Report dated Dec. 14, 2018 for European Patent Application No. 18196503.9.
Extended European Search Report dated Dec. 14, 2018 for European Patent Application No. 18196272.1.

* cited by examiner

ELECTRIC BRAKE SYSTEM AND OPERATING METHOD THEREOF

CROSS-REFERENCE TO RELATED APPLICATIONS

This application is based on and claims priority under 35 U.S.C. § 119 to Korean Patent Application No. 10-2017-0127467, filed on Sep. 29, 2017 in the Korean Intellectual Property Office, and Korean Patent Application No. 10-2017-0123547, filed on Sep. 25, 2017 in the Korean Intellectual Property Office, the disclosure of which is incorporated by reference herein in its entirety.

BACKGROUND

1. Field

The disclosure relates to an electric brake system and an operating method thereof, more particularly, to an electric brake system configured to generate a braking force using an electrical signal corresponding to displacement of a brake pedal and an operating method thereof.

2. Description of Related Art.

A vehicle is essentially equipped with a brake system for braking. Recently, various types of brake systems have been proposed for the safety of driver and passenger.

According to a conventional brake system, a hydraulic pressure for braking is supplied to a wheel cylinder by a booster, which is mechanically connected, upon stepping a brake pedal by a driver. However, since there is a growing need of various braking functions that accurately correspond to vehicle operating conditions, the electric brake system having a hydraulic pressure supplier has been widely used, wherein the hydraulic pressure supplier is configured to supply hydraulic pressure for braking to the wheel cylinder by receiving an electrical signal corresponding to a braking intention of a driver, from a pedal displacement sensor detecting displacement of a pedal when a driver presses the brake pedal.

When the electric brake system is in a normal operation mode, the brake pedal operation of the driver leads to the generation and the provision of the electrical signal. Accordingly, the hydraulic supplier is electrically operated and controlled to generate a hydraulic pressure for braking and transmit the hydraulic pressure to the wheel cylinder. As mentioned above, since the electric brake system is electrically operated and controlled, the electric brake system can implement complicated and various braking operations. However, when a technical problem occurs in a component of automotive electronics, a hydraulic pressure for braking is not stably formed and it threatens the safety of the passenger.

Therefore, the electric brake system may be switched to an abnormal operation mode when one component element fails or is out of control. In this case, a mechanism is required in which the operation of the driver's brake pedal must be directly linked to the wheel cylinder. That is, in the abnormal operation mode of the electric brake system, as the driver applies pressure to the brake pedal, the hydraulic pressure for braking should be directly generated and directly transmitted to the wheel cylinder.

RELATED ART DOCUMENT

Patent Document

EP 2 520 473 A1 (Honda Motor Co., Ltd.) 2012. 11. 7.

SUMMARY

Therefore, it is an aspect of the present disclosure to provide an electric brake system capable of stably providing a braking pressure of a vehicle, and an operating method thereof.

It is another aspect of the present disclosure to provide an electric brake system capable of improving the product productivity by simplifying a structure and by reducing the number of valves, and an operating method thereof.

It is another aspect of the present disclosure to provide an electric brake system capable of providing the stable braking effect in various operating conditions of the vehicle and an operating method thereof.

It is another aspect of the present disclosure to provide an electric brake system capable of having an improved performance and operational reliability, and an operating method thereof.

It is another aspect of the present disclosure to provide an electric brake system capable of having an improved durability of the product, and an operating method thereof.

It is another aspect of the present disclosure to provide an electric brake system capable of reducing the size of the product, and an operating method thereof.

Additional aspects of the present disclosure will be set forth in part in the description which follows and, in part, will be obvious from the description, or may be learned by practice of the present disclosure.

In accordance with an aspect of the disclosure, an electric brake system includes a hydraulic supplier configured to generate hydraulic pressure by operating a hydraulic piston by an electrical signal, which is output corresponding to a displacement of a brake pedal, and provided with a first pressure chamber provided on one side of the hydraulic piston movably accommodated in a cylinder block and a second pressure chamber provided on the other side of the hydraulic piston; and a hydraulic control unit provided with a first hydraulic circuit configured to control hydraulic pressure transmitted to two wheel cylinders, and a second hydraulic circuit configured to control hydraulic pressure transmitted to other two wheel cylinders. The hydraulic control unit includes a first hydraulic flow path communicated with the first pressure chamber, a second hydraulic flow path diverged from the first hydraulic flow path, a third hydraulic flow path diverged from the first hydraulic flow path and then connected to the second hydraulic circuit, a fourth hydraulic flow path communicated with the second pressure chamber and connected to the first hydraulic circuit, a fifth hydraulic flow path configured to connect the second hydraulic flow path to the first hydraulic circuit and the fourth hydraulic flow path, and a sixth hydraulic flow path configured to connect the second hydraulic flow path to the third hydraulic flow path.

The hydraulic control unit may include a first valve disposed on the second hydraulic flow path to control a flow of pressure medium, a second valve disposed on the third hydraulic flow path to control a flow of pressure medium, a third valve disposed on the fourth hydraulic flow path to control a flow of pressure medium, and a fourth valve disposed on the sixth hydraulic flow path to control a flow of pressure medium.

The first, third and fourth valves may be provided as a solenoid valve configured to control the flow of the pressure medium in two ways, and the second valve may be provided as a check valve configured to allow only the flow of the pressure medium flowing to the second hydraulic circuit from the first pressure chamber.

The electric brake system may further include a reservoir configured to store pressure medium; a master cylinder provided with a master chamber and a master piston displaceable by an operation of the brake pedal to compress and discharge the pressure medium accommodated in the master chamber according to a displacement; a simulator provided with a simulation chamber, and a simulation piston displaceable by the pressure medium discharged from the maser chamber to compress and discharge the pressure medium accommodated in the simulation chamber according to a displacement; and a reservoir flow path configured to communicate among the master chamber, the simulation chamber and the reservoir.

The electric brake system may further include a simulator check valve disposed on the reservoir flow path to allow only the flow of the pressure medium flowing from the reservoir to the master chamber and the simulation chamber; and a simulator valve disposed on a bypass flow path in parallel with the simulator check valve on the reservoir flow path to control the flow of the pressure medium in two ways.

The master piston may include a first master piston directly pressed by the brake pedal, and a second master piston indirectly pressed by the first master piston. The master chamber may include a first master chamber in which the first master piston is placed, and a second master chamber in which the second master piston is placed. The simulation piston may be configured to be displaceable by the pressure medium compressed and discharged from the first maser chamber, and the reservoir flow path may communicate among the first master chamber, the simulation chamber and the reservoir.

The simulator may further include a reaction force spring configured to elastically support the simulation piston.

The electric brake system may further include a first dump flow path configured to connect the first pressure chamber to the reservoir; a second dump flow path configured to connect the second pressure chamber to the reservoir; a first dump valve disposed on the first dump flow path to control the flow of the pressure medium, and provided as a check valve configured to allow only the flow of the pressure medium flowing into the first pressure chamber from the reservoir; a second dump valve disposed on the second dump flow path to control the flow of the pressure medium, and provided as a check valve configured to allow only the flow of the pressure medium flowing into the second pressure chamber from the reservoir; and a third dump valve disposed on a bypass flow path in parallel with the second dump valve on the second dump flow path to control the flow of the pressure, and provided as a solenoid valve configured to control the flow of the pressure medium in two ways between the reservoir and the second pressure chamber.

The electric brake system may further include a first backup flow path configured to connect the first master chamber to the first hydraulic circuit; a second backup flow path configured to connect the second master chamber to the second hydraulic circuit; a first cut valve provided in the first backup flow path to control the flow of the pressure medium; and a second cut valve provided in the second backup flow path to control the flow of the pressure medium.

The first and fourth valves may be provided as a solenoid valve configured to control the flow of the pressure medium in two ways, the second valve may be provided as a check valve configured to allow only the flow of the pressure medium flowing to the second hydraulic circuit from the first pressure chamber; and the third valve may be provided as a check valve configured to allow only the flow of the pressure medium flowing to the first hydraulic circuit or the fifth hydraulic flow path from the second pressure chamber.

The hydraulic control unit may include a first valve disposed on the second hydraulic flow path to control a flow of pressure medium, a second valve disposed on the third hydraulic flow path to control a flow of pressure medium, a third valve disposed on the fourth hydraulic flow path to control a flow of pressure medium, and a fourth valve disposed on the fifth hydraulic flow path to control a flow of pressure medium.

The first and fourth valves may be provided as a solenoid valve configured to control the flow of the pressure medium in two ways, the second valve may be provided as a check valve configured to allow only the flow of the pressure medium flowing to the second hydraulic circuit from the first pressure chamber; and the third valve may be provided as a check valve configured to allow only the flow of the pressure medium flowing to the first hydraulic circuit or the fifth hydraulic flow path from the second pressure chamber.

A normal operation mode may include sequentially performing a low pressure mode providing a relatively low hydraulic pressure and a high pressure mode providing a relatively high hydraulic pressure, according to a hydraulic level transmitted to the wheel cylinder from the hydraulic supplier.

The low pressure mode may include opening the first and fourth valves; and providing hydraulic pressure, which is generated in the first pressure chamber by the forward movement of the hydraulic piston, to the first hydraulic circuit and the second hydraulic circuit.

The high pressure mode may include opening the first and fourth valves; providing some of hydraulic pressure, which is generated in the first pressure chamber by the forward movement of the hydraulic piston, to the first hydraulic circuit and the second hydraulic circuit after the low pressure mode; opening the third valve; providing some of the remaining hydraulic pressure, which is generated in the first pressure chamber, to the second hydraulic circuit.

A release of the low pressure mode may include opening the first and fourth valves; and allowing the pressure medium of the first hydraulic circuit and the second hydraulic circuit to be collected to the first pressure chamber by generating a negative pressure in the first pressure chamber by the backward movement of the hydraulic piston.

A release of the high pressure mode may include opening the first and fourth valves; allowing the pressure medium of the first hydraulic circuit and the second hydraulic circuit to be collected to the first pressure chamber by generating a negative pressure in the first pressure chamber by the backward movement of the hydraulic piston; opening the third valve; and supplying the pressure medium of the second pressure chamber to the first pressure chamber.

An abnormal operation mode may include communicating the first master chamber with the first hydraulic circuit by opening the first cut valve; and communicating the second master chamber with the second hydraulic circuit by opening the second cut valve.

A normal operation mode may include opening the simulator valve, generating a displacement of the simulation piston by the pressure medium discharged from the first master chamber; and supplying the pressure medium accommodated in the simulation chamber to the reservoir along the reservoir flow path.

An inspection mode configured to identify the presence of a leakage in the master cylinder or the simulator valve may include closing the simulator valve and the second cut valve and opening the first cut valve; providing hydraulic pressure, which is generated by operating the hydraulic supplier, to the first master chamber;

and comparing a hydraulic pressure value of the pressure medium estimated based on displacement amount of the hydraulic piston, with a hydraulic pressure value of the pressure medium supplied to the first master chamber.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

The present disclosure will now be described more fully with reference to the accompanying drawings, in which embodiments of the disclosure are shown. Embodiments are provided so that this disclosure will be thorough and complete, and will fully convey the concept of the disclosure to those skilled in the art. In the description of the present disclosure, if it is determined that a detailed description of commonly-used technologies or structures related to the embodiments of the present disclosure may unnecessarily obscure the subject matter of the disclosure, the detailed description may be omitted and parts of the elements may be exaggerated in order to facilitate understanding.

Figure 1:
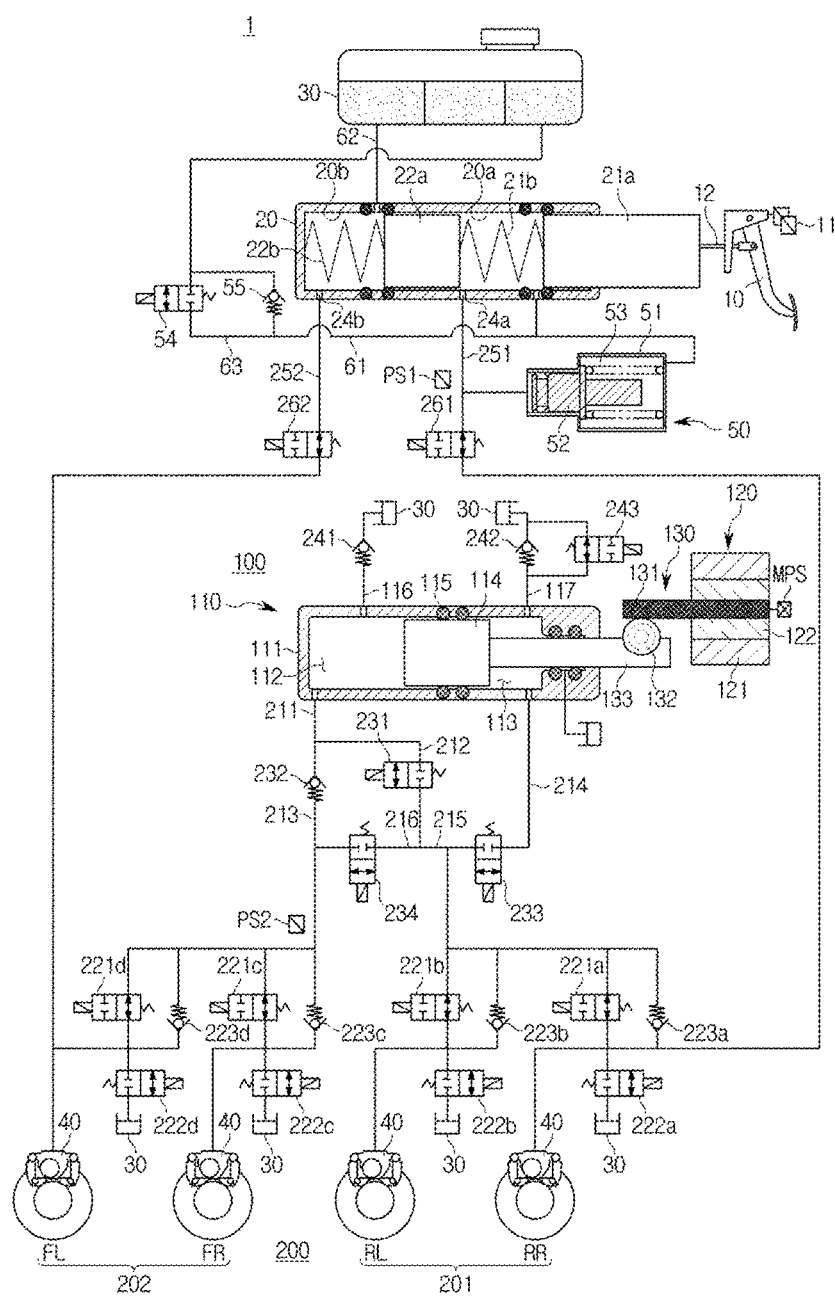
FIG. 1 is a hydraulic circuit diagram illustrating an electric brake system according to a first embodiment.

FIG. 1 is a hydraulic circuit diagram illustrating an electric brake system 1 according to a first embodiment.

Referring to FIG. 1, an electric brake system 1 according to the first embodiment may include a master cylinder 20, a reservoir 30, a wheel cylinder 40, a simulator, a hydraulic supplier 100, a hydraulic control unit 200, and an electronic control unit (ECU; not shown). The master cylinder 20 is configured to press and discharge pressure medium such as brake oil contained therein, by a pedal effort of a brake pedal 10. The reservoir 30 is configured to store the pressure medium by being communicated with the master cylinder 20. The wheel cylinder 40 is configured to brake each vehicle wheel; rear right wheel (RR), rear left wheel (RL), front right wheel (FR) and front left wheel (FL) by receiving a hydraulic pressure of the pressure medium. The simulator 50 is configured to provide a reaction force against the pedal effort of the brake pedal 10, to a driver. The hydraulic supplier 100 is configured to generate a hydraulic pressure of the pressure medium through a mechanical operation, by receiving an electrical signal corresponding to a braking intention of a driver, from a pedal displacement sensor 11 detecting a displacement of the brake pedal 10. The hydraulic control unit 200 is configured to control the hydraulic pressure transmitted to the wheel cylinder 40. The ECU is configured to control the hydraulic supplier 100 and a variety of valves based on the hydraulic pressure information and the pedal displacement information.

The master cylinder 20 may press and discharge the pressure medium provided therein, by having at least one chamber. The master cylinder 20 may include first and second master chambers 20a and 20b, and first and second mater pistons 21a and 22a provided in the master chambers 20a and 20b, respectively.

The first master chamber 20a is provided with the first master piston 21a connected to an input rod 12 and the second master chamber 20b is provided with the second master piston 22a. In addition, in the first master chamber 20a, the pressure medium may be introduced and discharged through a first hydraulic port 24a, and in the second master chamber 20b, the pressure medium may be introduced and discharged through a second hydraulic port 24b. As an example, the first hydraulic port 24a may be connected to a first backup flow path 251 described later, and the second hydraulic port 24b may be connected to a second backup flow path 252 described later. In addition, a third hydraulic port 24c connected to a first reservoir flow path 61 described later may be provided in the first master chamber 20a.

According to embodiments, by having two master chambers 20a and 20b that are operated independently of each other, the master cylinder 20 may secure the safety when failure of components occurs. For example, any one of two master chambers 20a and 20b is connected to the rear right wheel (RR) and the rear left wheel (RL), and the other of two master chambers 20a and 20b is connected to the front right wheel (FR) and the front left wheel (FL), thereby braking the vehicle even when any one master chamber fails.

As an example, any one of two master chambers may be connected to the front left wheel (FL) and the rear left wheel (RL), and the other of two mater chambers may be connected to the rear right wheel (RR) and the front right wheel (FR). Alternatively, any one of two master chambers may be connected to the front left wheel (FL) and the rear left wheel (RL), and the other of two mater chambers may be connected to the rear right wheel (RR) and the front right wheel (FR). That is, the position of the wheel connected to the master chamber of the master cylinder 20 is not limited to any one structure and thus the position thereof may have a variety of structures.

A first spring 21b may be provided between the first master piston 21a and the second master piston 22a of the master cylinder 20, and a second spring 22b may be provided between the second master piston 22a and an end of the master cylinder 20. That is, the first master piston 21 b may be accommodated in the first master chamber 20a, and the second master piston 22a may be accommodated in the second master chamber 20b.

When the first master piston 21a and the second master piston 22a move according to the displacement caused by the operation of the brake pedal by a driver, the first spring 21b and the second spring 22b may be compressed. When the pedal effort of the brake pedal 10 is released, the first spring 21b and the second spring 22b may expand due to the elastic force and thus the first and second master pistons 21a and 22a may be returned to their original positions.

Meanwhile, the brake pedal 10 and the first master piston 21a of the master cylinder 20 may be connected by the input rod 12. The input rod 12 may be directly connected to the first master piston 21a or may be provided in close contact with the first master piston 21a without a gap. Therefore, when the driver puts the brake pedal 10, the input rod 12 may directly press the master cylinder 20 without a pedal invalid stroke section.

The first master chamber 20a may be connected to a simulation chamber 51 of the simulator 50, which is described later, together with the reservoir 30 through the first reservoir flow path 61. The second master chamber 20b may be connected to the reservoir 30 through a second reservoir flow path 62. The first reservoir flow path 61 may be connected to communicate among the rear end of the simulation chamber 51 of the simulator 50, the first master chamber 20a and the reservoir 30. On the first reservoir flow path 61, a bypass flow path 63, a simulator valve 54 and a check valve 55, which is described later, may be provided. A detailed description thereof will be described later.

The master cylinder 20 may include two sealing members 25a and 25b disposed on the front and rear sides of the first reservoir flow path 61 connected to the first master chamber 20a. The master cylinder 20 may include two sealing members 25c and 25d disposed on the front and rear sides of the second reservoir flow path 62. The sealing member 25a, 25b, 25c and 25d may be provided in the form of a ring structure that protrudes on an inner wall of the master cylinder 20 or an outer circumferential surface of the piston 21a and 22a.

The simulator 50 may be connected to the first backup flow path 251, which is described later, and receive the hydraulic pressure discharged from the master chamber 20a so as to provide the reaction force against the pedal effort of the brake pedal 10, to the driver. Since the simulator 50 provides the reaction force against the pedal effort applied to the brake pedal 10 by the driver, it may be possible to accurately operate the brake pedal 10 by providing the sense of the pedal to the driver and thus it may be possible to accurately regulate the braking force of the vehicle.

Referring to FIG. 1, the simulator 50 may include a simulation piston 52, the simulation chamber 51, a pedal simulator and a simulator valve 54. The simulation piston 52 is provided to be displaceable by the pressure medium discharged from the first hydraulic port 24a of the master cylinder 20. The simulation chamber 51 is configured to allow the pressure medium stored therein to be pressed or discharged by the displacement of the simulation piston 52. The pedal simulator is provided with a reaction force spring 53 elastically supporting the simulation piston 52. The simulator valve 54 is provided on a downstream side of the simulation chamber 51 on the first reservoir flow path 61.

The simulation piston 52 and the reaction force spring 53 may be configured to have a displacement in a certain range, in the first simulation chamber 51 by the pressure medium, wherein the pressure medium flows to the simulation chamber 51 through the first backup flow path 251, which is described later, from the first master chamber 20a. The simulator valve 54 may be arranged in parallel with the check valve 55 on the first the reservoir flow path 61 connecting the rear end of the simulation chamber 51 to the reservoir 30. Even when the simulation piston 52 is returned to the original position by the check valve 55, the pressure medium may be introduced from the reservoir 30 and thus the simulation chamber 51 may be always filled with the pressure medium.

Meanwhile, the reaction force spring 53 shown in the drawings, is merely an example configured to provide the elastic force to the simulation piston 52, and thus a variety of structure may be used if it is able to store the elastic force. For example, it may be formed of a material such as rubber, or various members capable of storing an elastic force by having a coil or a plate shape.

The check valve 55 may be configured to allow the flow of pressure medium flowing to the first master chamber 20a and the simulation chamber 51 from the reservoir 30, and configured to block the flow of pressure medium flowing to the reservoir 30 from the first master chamber 20a and the simulation chamber 51. In other words, the check valve 55 may be configured to allow only the flow of the pressure medium in the direction towards the first master chamber 20a and the simulation chamber 51 from the reservoir 30.

The bypass flow path 63 may be in parallel to the check valve 55 on the first reservoir flow path 61. The simulator valve 54 configured to control the flow of the pressure medium in both directions may be provided on the bypass flow path 63. Particularly, the bypass flow path 63 may be provided by bypassing the front and rear sides of the check valve 55 on the first reservoir flow path 61. The simulator valve 54 may be provided as a normally closed solenoid valve that normally operates to close and operates to open the valve when receiving an electrical signal from the ECU described later.

Since the simulator valve 54 is opened when the driver applies pressure to the brake pedal 10 in the normal operation mode, the pressure medium, which is accommodated in the rear side of the simulation piston 52 of the simulation chamber 51 (i.e., the right side of the simulation piston with respect to the drawing), may be transmitted to the reservoir 30 through the first reservoir flow path 61. Accordingly, the pressure medium in the first master chamber 20a may be moved to the front side of the simulation piston 52 of the simulation chamber 51 (i.e., the left side of the simulation piston with respect to the drawing), so as to compress the reaction force spring 53, thereby providing the sense of the pedal to the driver.

Meanwhile, as the first master piston 21a is advanced by the driver's operation of the brake pedal 10, the third hydraulic port 24c may be blocked and sealed by the first master piston 21a and the two sealing members 25a and 25b. Therefore, it may be possible to prevent the pressure medium, which is accommodated in the rear side of the simulation piston 52, from being reintroduced into the first master chamber 20a through the first reservoir flow path 61.

As for the operation of the simulator 50, when the driver applies pressure by operating the brake pedal 10, the simulator valve 54 may be opened, and the first master piston 21a may be moved. Accordingly, the pressure medium in the first master chamber 20a may be supplied to the front side of the simulation piston 52 in the simulation chamber 51 so as to generate the displacement of the simulation piston 52. At this time, the pressure medium filled in the rear side of the simulation piston 52 in the simulation chamber 51 may move to the reservoir 30 along the first reservoir flow path 61, wherein the first reservoir flow path 61 is opened due to the open of the simulator valve 54. Therefore, the simulation piston 52 may compress the reaction force spring 53 and thus the reaction force may be provided to the driver as the sense of the pedal.

When the driver releases the pedal effort on the brake pedal 10, the reaction force spring 53 may be expanded by the elastic force and the simulation piston 52 may return to the original position. The pressure medium filled in the front side of the simulation piston 52 in the simulation chamber 51 may be discharged to the first master chamber 20a or the first backup flow path 251, and the inside of the simulation chamber 51 may be filled with the pressure medium again since the rear side of the simulation piston 52 in the simulation chamber 51 is supplied with the pressure medium from the reservoir 30 through the first reservoir flow path 61.

As mentioned above, since the inside of the simulation chamber 51 is always filled with the pressure medium, the friction of the simulation piston 52 may be minimized upon the operation of the simulator 50, and thus it may be possible to improve the durability of the simulator 50 and prevent foreign materials from being introduced into the inside from the outside.

In addition, the simulator valve 54 may also function as an inspection valve that operates in an inspection mode of the electric brake system 1 according to embodiments. A detailed description thereof will be described later.

The drawing illustrates a number of reservoirs 30, and each reservoir 30 uses the same reference numerals. The reservoir may be provided as the same component or different components. For example, the reservoir 30 connected to the simulator 50 may be the same as the reservoir 30 connected to the master cylinder 20, or the reservoir 30 connected to the simulator 50 may be a storage that stores the pressure medium and that is independent of the reservoir 30 connected to the master cylinder 20.

The hydraulic supplier 100 may be configured to generate the hydraulic pressure of the pressure medium through a mechanical operation by receiving an electrical signal corresponding to a braking intention of a driver, from the pedal displacement sensor 11 detecting displacement of the brake pedal 10.

The hydraulic supplier 100 may include a hydraulic pressure supply unit 110, a motor 120, and a power converter 130. The hydraulic pressure supply unit 110 is configured to provide a pressure of the pressure medium that is to be transmitted to the wheel cylinder 40. The motor 120 is configured to generate a rotational force by an electrical signal of the pedal displacement sensor 11. The power converter 130 is configured to convert the rotational motion of the motor 120 into a linear motion and transmit the linear motion to the hydraulic pressure supply unit 110. The hydraulic pressure supply unit 110 may be operated not by the driving force supplied from the motor 120 but by the pressure provided by a high pressure accumulator.

The hydraulic pressure supply unit 110 may include a cylinder block 111 having a pressure chamber in which the pressure medium is supplied and stored, a hydraulic piston 114 accommodated in the cylinder block 111, a sealing member disposed between the hydraulic piston 114 and the cylinder block 111 to seal the pressure chamber, and a drive shaft 133 configured to transmit the power output from the power converter 130, to the hydraulic piston 114.

The pressure chamber may include a first pressure chamber 112 disposed in the front side of the hydraulic piston 114 (i.e., a forward direction or the left side of the hydraulic piston with respect to the drawing), and a second pressure chamber 113 disposed in the rear side of the hydraulic piston 114 (i.e., a backward direction or the right side of the hydraulic piston with respect to the drawing). That is, the first pressure chamber 112 is divided by the cylinder block 111 and the front end of the hydraulic piston 114 so that the volume of the first pressure chamber 112 is changed according to the movement of the hydraulic piston 114, and the second pressure chamber 113 is divided by the cylinder block 111 and the rear end of the hydraulic piston 114 so that the volume of the second pressure chamber 113 is changed according to the movement of the hydraulic piston 114.

The first pressure chamber 112 is connected to a first hydraulic flow path 211, which is described later, through a first communication hole 111a formed in the cylinder block 111. The second pressure chamber 113 is connected to a fourth hydraulic flow path 214, which is described later, through a second communication hole 111b formed in the cylinder block 111.

The sealing member includes a piston sealing member 115 provided between the hydraulic piston 114 and the cylinder block 111 to seal between the first pressure chamber 112 and the second pressure chamber 113, and a drive shaft sealing member (not shown) provided between the drive shaft 133 and the cylinder block 111 to seal the second pressure chamber 113 and an opening of the cylinder block 111. Hydraulic pressure or negative pressure of the first and second pressure chambers 112 and 113 generated by the forward or backward movement of the hydraulic piston 114 may be sealed by the piston sealing member 115 and thus the hydraulic pressure or the negative pressure may be transmitted to the first and fourth hydraulic flow paths 211 and 214 without not being leaked to the second pressure chamber 113. Hydraulic pressure or negative pressure of the second pressure chamber 113 generated by the forward or backward movement of the hydraulic piston 114 may be sealed by the piston sealing member 115 so as not to be leaked to the outside of the cylinder block 111.

The first and second pressure chambers 112 and 113 may be connected to the reservoir 30 through first and second dump flow paths 116 and 117. The first and second pressure chambers 112 and 113 may receive the pressure medium from the reservoir 30 by the first and second dump flow paths 116 and 117 and store the pressure medium or transmit the pressure medium of the first and second pressure chambers 112 and 113 to the reservoir 30. For this, the first dump flow path 116 may be communicated with the first pressure chamber 112 by the third communication hole 111c formed in the cylinder block 111 and then connected to the reservoir 30. The second dump flow path 117 may be communicated with the second pressure chamber 113 by the fourth communication hole 111d formed in the cylinder block 111 and then connected to the reservoir 30.

The motor 120 is configured to generate a driving force by an electrical signal output from the electronic control unit (ECU). The motor 120 may include a stator 121 and a rotor 122 and rotate in a normal direction or a reverse direction, thereby providing the power for generating the displacement of the hydraulic piston 114. The rotation angular velocity and the rotation angle of the motor 120 may be precisely controlled by a motor position sensor (MPS). Since the motor 120 is a well-known technology, a detailed description will be omitted.

The power converter 130 is configured to convert the rotational force of the motor 120 into the linear motion. For example, the power converter 130 may include a worm shaft 131, a worm wheel 132 and the drive shaft 133.

The worm shaft 131 may be formed integrally with the rotation shaft of the motor 120. The worm may be formed on an outer circumferential surface thereof to be engaged with the worm wheel 132 so as to rotate the worm wheel 132. The worm wheel 132 may be connected to be engaged with the drive shaft 133 so as to linearly move the drive shaft 133. Since the drive shaft 133 is connected to the hydraulic piston 114, the hydraulic piston 114 may be moved in the cylinder block 111 in a sliding manner.

As the above mentioned operation is described again, when the displacement of the brake pedal 10 is detected by the pedal displacement sensor 11, the detected signal is transmitted to the ECU and the ECU drives the motor 120 to rotate the worm shaft 131 in one direction. The rotational force of the worm shaft 131 is transmitted to the drive shaft 133 via the worm wheel 132, and the hydraulic piston 114 connected to the drive shaft 133 moves forward in the cylinder block 111 to generate the hydraulic pressure in the first pressure chamber 112.

On the other hand, when the pedal effort of the brake pedal 10 is released, the ECU drives the motor 120 to rotate the worm shaft 131 in the opposite direction. The worm wheel 132 also rotates in the opposite direction and the hydraulic piston 114 connected to the drive shaft 133 moves backward in the cylinder block 111 to generate the negative pressure in the first pressure chamber 112.

The generation of the hydraulic pressure and the negative pressure in the second pressure chamber 113 may be realized by the operation performed in a direction opposite to the direction mentioned above. That is, when the displacement of the brake pedal 10 is detected by the pedal displacement sensor 11, the detected signal is transmitted to the ECU and the ECU drives the motor 120 to rotate the worm shaft 131 in the opposite direction. The rotational force of the worm shaft 131 is transmitted to the drive shaft 133 via the worm wheel 132, and the hydraulic piston 114 connected to the drive shaft 133 moves backward in the cylinder block 111 to generate the negative pressure in the second pressure chamber 113.

On the other hand, when the pedal effort of the brake pedal 10 is released, the ECU drives the motor 120 in one direction to rotate the worm shaft 131 in the one direction. The worm wheel 132 also rotates in the opposite direction and the hydraulic piston 114 connected to the drive shaft 133 moves forward in the cylinder block 111 to generate the negative pressure in the second pressure chamber 113.

As mentioned above, since the hydraulic pressure and the negative pressure are generated in the first pressure chamber 112 and the second pressure chamber 113 according to the rotation direction of the worm shaft 131 caused by the drive of the motor 120, the hydraulic supplier 100 may determine whether to realize a braking by transmitting the hydraulic pressure or to release the braking by using the negative pressure, by controlling the valves. A detailed description of that will be described later.

Although not shown in the drawings, the power converter 130 may be configured with a ball-screw nut assembly. For example, the power converter 130 may be configured with a screw formed integrally with the rotating shaft of the motor 120 or a screw connected to be rotated together with the rotating shaft of the motor 120, and a ball nut having a linear movement according to the rotation of the screw by being screwed with the screw in a state in which a rotation is limited. Since the structure of the ball screw nut assembly is a well-known technique, a detailed description thereof will be omitted. In addition, according to an embodiment, there is no limitation in the structure of the power converter 130 and the power converter 130 may employ a variety of structures and methods if it is able to convert the rotational motion into the linear motion.

The hydraulic control unit 200 may be configured to control the hydraulic pressure transmitted to the wheel cylinder 40. The ECU controls the hydraulic supplier 100 and various valves, based on the hydraulic pressure information and the pedal displacement information.

The hydraulic control unit 200 may include a first hydraulic circuit 201 for controlling the flow of hydraulic pressure to be transmitted to the two wheel cylinders 40 and a second hydraulic circuit 201 for controlling the flow of hydraulic pressure to the other two wheel cylinders 40. The hydraulic control unit 200 may further include a variety of flow paths and valves to control the hydraulic pressure transmitted from the master cylinder 20 and the hydraulic supplier 100 to the wheel cylinder 40.

Hereinafter, the hydraulic control unit 200 will be described with reference to FIG. 1.

Referring to FIG. 1, the first hydraulic flow path 211 may connect the first pressure chamber 112 to the first and second hydraulic circuits 201 and 202. The first hydraulic flow path 211 may be branched into a second hydraulic flow path 212 and a third hydraulic flow path 213. The third hydraulic flow path 213 may be connected to the second hydraulic circuit 202. Therefore, the hydraulic pressure generated in the first pressure chamber 112 by the advance of the hydraulic piston 114 may be transmitted to the second hydraulic circuit 202 through the first hydraulic flow path 211 and the third hydraulic flow path 213. The hydraulic pressure may be transmitted to the first hydraulic circuit 201 through the first hydraulic flow path 211, the second hydraulic flow path 212, and a fifth hydraulic flow path 215 described later.

A first valve 231 and a second valve 232 configured to control the flow of the pressure medium may be provided on the second hydraulic flow path 212 and the third hydraulic flow path 213, respectively.

The first valve 231 may employ a two-way valve configured to control the flow of the pressure medium transmitted through the second hydraulic flow path 212. The first valve 231 may be provided as a normally closed solenoid valve that normally operates to close and operates to open the valve when receiving an electrical signal from the ECU.

The second valve 232 may employ a check valve configured to allow the flow of pressure medium flowing to the second hydraulic circuit 202 from the first pressure chamber 122 and configured to block the flow of pressure medium flowing in the opposite direction. That is, the second valve 232 may allow the hydraulic pressure generated in the first pressure chamber 112 to be transmitted to the second hydraulic circuit 202 while preventing the hydraulic pressure of the second hydraulic circuit 202 from being leaked to in the first pressure chamber 112 through the third hydraulic flow path 213.

The fourth hydraulic flow path 214 may be communicated with the second pressure chamber 113. The fifth hydraulic flow path 215 may connect the second hydraulic flow path 212 to the first hydraulic circuit 201 and the fourth hydraulic flow path 214. For this, one end of the fifth hydraulic circuit may be connected to the rear end of the first valve 231 on the second hydraulic flow path 212, and the other end of the fifth hydraulic circuit may be connected to the fourth hydraulic flow path 214 and the first hydraulic circuit 201. Opposite ends of sixth hydraulic circuit may be communicated with the rear end of the first and second valves 231 and 232 on the second and third hydraulic flow path 212 and 213 so as to connect the second hydraulic flow path 212 to the third hydraulic flow path 213.

A third valve 233 and a fourth valve 234 configured to control the flow of the pressure medium may be provided on the fourth and sixth hydraulic flow paths 214 and 216, respectively.

The third valve 233 may employ a two-way valve configured to control the flow of the pressure medium between the fourth hydraulic flow path 214 and the fifth hydraulic flow path 215 communicated with the second pressure chamber 113 or the hydraulic flow path connected to the first hydraulic circuit 201. The third valve 233 may be provided as a normally closed solenoid valve that normally operates to close and operates to open the valve when receiving an electrical signal from the ECU.

The fourth valve 234 may employ a two-way valve configured to control the flow of the pressure medium between the second hydraulic flow path 212 and the third hydraulic flow path 213 communicated with opposite ends of the sixth hydraulic flow path 216 while controlling the flow of the pressure medium flowing through the fourth and the fifth hydraulic flow path 214 and 215. The fourth valve 234 may be provided as a normally closed solenoid valve that normally operates to close and operates to open the valve when receiving an electrical signal from the ECU.

By using the above mentioned flow path and valve, the hydraulic pressure generated in the first pressure chamber 112 by the forward movement of the hydraulic piston 114 may be transmitted to the first and second hydraulic circuits 201 and 202. In addition, the hydraulic pressure generated in the second pressure chamber 113 by the backward movement of the hydraulic piston 114 may be transmitted to the first and second hydraulic circuits 201 and 202 through the fourth to the sixth hydraulic flow paths 214, 215 and 216.

Further, since the opposite ends of the sixth hydraulic flow path 216 are communicated with the rear end of the first and second valves 231 and 232 on the second and the third hydraulic flow paths 212 and 213, the fourth valve 234 may be opened when a failure occurs in first valve 231 or the second valve 232. Therefore, the hydraulic pressure generated in the first pressure chamber 112 may be stably transmitted to the first hydraulic circuit 201 and the second hydraulic circuit 202. Alternatively, since the third and fourth valves 233 and 234 are opened, the hydraulic pressure generated in the second pressure chamber 113 may be stably transmitted to the first hydraulic circuit 201 and the second hydraulic circuit 202.

When the pressure medium is extracted from the wheel cylinder 40 to supply the pressure medium to the first pressure chamber 112 so as to release the pressure medium applied to the wheel cylinder 40, the first valve 231 and the fourth valve 234 may be opened. This is because the second valve 232 provided in the third hydraulic flow path 213 may employ a check valve configured to allow the flow of the pressure medium in one direction.

Hereinafter the first hydraulic circuit 201 and the second hydraulic circuit 202 of the hydraulic control unit 200 will be described.

The first hydraulic circuit 201 may control the hydraulic pressure of the wheel cylinders 40 provided on any two wheels among the front left wheel (FL), the front right wheel (FR), the rear left wheel (RL) and the rear right wheel (RR), and the second hydraulic circuit 202 may control the hydraulic pressure of the wheel cylinders 40 provided on the other two wheels among the front left wheel (FL), the front right wheel (FR), the rear left wheel (RL) and the rear right wheel (RR). As described above, the positions of the target wheel cylinders 40 controlled by the first hydraulic circuit 201 and the second hydraulic circuit 202 are not limited to any one arrangement, and thus various combinations thereof may be allowed.

The first hydraulic circuit 201 may receive the hydraulic pressure from the first pressure chamber 112 of the hydraulic supplier 100 through the first hydraulic flow path 211, the second hydraulic flow path 212 and the fifth hydraulic flow path 215 or from the second pressure chamber 113 of the hydraulic supplier 100 through the fourth hydraulic flow path 214. The first hydraulic circuit 201 may be branched into two flow paths connected to two vehicle wheels. The first hydraulic circuit 201 may receive the hydraulic pressure from the first pressure chamber 112 of the hydraulic supplier 100, by the pressure medium that sequentially passes through the first hydraulic flow path 211, the third hydraulic flow path 213, the sixth hydraulic flow path 216, and the fifth hydraulic flow path 215.

The second hydraulic circuit 202 may receive the hydraulic pressure from the first pressure chamber 112 of the hydraulic supplier 100 through the first hydraulic flow path 211 and the third hydraulic flow path 213 or from the second pressure chamber 113 of the hydraulic supplier 100 through the fourth to sixth hydraulic flow paths 214, 215 and 216. The second hydraulic circuit 202 may be branched into two flow paths connected to two vehicle wheels. The second hydraulic circuit 202 may receive the hydraulic pressure from the first pressure chamber 112 of the hydraulic supplier 100, by the pressure medium that passes through the first hydraulic flow path 211, the second hydraulic flow path 212, and the sixth hydraulic flow path 216 and then bypasses.

The first and second hydraulic circuits 201 and 202 may respectively include a plurality of inlet valves 221: 221a, 221b, 221c, and 221d to control the flow and hydraulic pressure of the pressure medium. As an example, two inlet valves 221a and 221b connected to the second hydraulic flow path 212 to control the hydraulic pressure transmitted to the two wheel cylinders 40 may be provided in the first hydraulic circuit 201. Two inlet valves 221c and 221d connected to the third hydraulic flow path 213 to control the hydraulic pressure transmitted to the two wheel cylinders 40 may be provided in the second hydraulic circuit 202.

The inlet valves 221 may be provided as a normally open solenoid valve that is disposed upstream of the wheel cylinder 40, and normally operates to open and operates to close the valve when receiving an electrical signal from the ECU.

The first and second hydraulic circuits 201 and 202 may include check valves 223a, 223b, 223c and 223d disposed in parallel with the inlet valve 221a, 221b, 221c and 221d, respectively. The check valves 223a, 223b, 223c and 223d may be provided on a bypass flow path connecting the front side to the rear side of each inlet valve 221a, 221b, 221c and 221d in the first and second hydraulic circuits 201 and 202. The check valves 223a, 223b, 223c and 223d may be configured to allow the flow of the pressure medium from the wheel cylinder 40 to the hydraulic pressure supply unit 110, and configured to block the flow of the pressure medium from the hydraulic pressure supply unit 110 to the wheel cylinder 40. The check valves 223a, 223b, 223c and 223d may rapidly extract the hydraulic pressure of the pressure medium applied to the wheel cylinder 40 and although the inlet valve 221a, 221b, 221c and 221d is not operated normally, the check valves 223a, 223b, 223c and 223d may allow the hydraulic pressure of the pressure medium applied to the wheel cylinder 40 to be introduced into the hydraulic pressure supply unit 110.

The first and second hydraulic circuits 201 and 202 may be provided with a plurality of outlet valves 222; 222a, 222b, 222c and 222d connected to the reservoir 30 to improve the performance upon releasing the braking. Each outlet valve 222 may be connected to each wheel cylinder 40 to control the flow in which the pressure medium is discharged from the wheel cylinder 40 of each vehicle wheel RR, RL, FR, and FL. That is, the outlet valve 222 may control the decompression of the pressure such that the outlet valve 222 detects the braking pressure of the each vehicle wheel RR, RL, FR, and FL and the outlet valve 222 is selectively opened as decompression braking is needed.

The outlet valve 222 may be provided as a normally closed solenoid valve that normally operates to close and operates to open the valve when receiving an electrical signal from the ECU.

First and second dump valves 241a nd 242 configured to control the flow of the pressure medium may be disposed on the first and second dump flow path 116 and 117. Referring to again FIG. 1, the first and second dump valves 241a nd 242 may employ a check valve configured to allow the flow of pressure medium flowing to the first and second pressure chamber 112 and 113 from the reservoir 30, and configured to block the flow of the pressure medium to the opposite direction. That is, the first dump valve 241 may allow the pressure medium to flow to the first pressure chamber 112 from the reservoir 30 and prevent the pressure medium from flowing from the first pressure chamber 112 to the reservoir 30. The second dump valve 242 may allow the pressure medium to flow to the second pressure chamber 113 from the reservoir 30 and prevent the pressure medium from flowing from the second pressure chamber 113 to the reservoir 30.

In addition, a bypass flow path may be in parallel to the second dump valve 242 on the second dump flow path 117. Particularly, the bypass flow path may be configured to bypass the front and rear sides of the second dump valve 242 on the second dump flow path 117. A third dump valve 243 configured to control the flow of the pressure medium may be disposed between the second pressure chamber 113 and the reservoir 30.

The third dump valve 243 may employ a two-way valve configured to control the flow of the pressure medium between the second pressure chamber 113 and the reservoir 30. The third dump valve 243 may be provided as a normally open solenoid valve that normally operates to open and operates to close the valve when receiving an electrical signal from the ECU.

According to an embodiment, the hydraulic supply unit 110 of the electric brake system 1 may be operated in a double-action manner.

Particularly, as the hydraulic piston 114 moves forward, the hydraulic pressure generated in the first pressure chamber 112 may be transmitted to the first hydraulic circuit 201 through the first hydraulic flow path 211, the second hydraulic flow path 212, and the fifth hydraulic flow path 215 so as to realize the braking of two wheel cylinder 40, and the hydraulic pressure may be transmitted to the second hydraulic circuit 202 through the first hydraulic flow path 211 and the third hydraulic flow path 213 so as to realize the braking of the other two wheel cylinder 40.

In the same way, as the hydraulic piston 114 moves backward, the hydraulic pressure generated in the second pressure chamber 113 may be transmitted to the first hydraulic circuit 201 through the fourth hydraulic flow path 214 so as to realize the braking of two wheel cylinder 40, and the hydraulic pressure may be transmitted to the second hydraulic circuit 202 through the fourth hydraulic flow path 214 and the fifth and sixth hydraulic flow path 215 and 216 so as to realize the braking of the other two wheel cylinder 40.

In addition, as the hydraulic piston 114 moves backward, the negative pressure generated in the first pressure chamber 112 may suction the pressure medium of the wheel cylinder 40 installed in the first hydraulic circuit 201 to allow the pressure medium to return to the first pressure chamber 112 through the fifth hydraulic flow path 215, the second hydraulic flow path 212 and the first hydraulic flow path 211, and suction the pressure medium of the wheel cylinder 40 installed in the second hydraulic circuit 202 to allow the pressure medium to return to the first pressure chamber 112 through the third hydraulic flow path 213 and the first hydraulic flow path 211.

According to an embodiment, the electric brake system 1 may include the first and second backup flow path 251 and 252, wherein the first and second backup flow path 251 and 252 are configured to realize the braking by directly supplying the pressure medium, which is discharged from the master cylinder 20, to the wheel cylinder 40 when the electric brake system is not normally operated. A mode in which the hydraulic pressure of the master cylinder 20 is directly transmitted to the wheel cylinder 40 is referred to as a fallback mode.

The first backup flow path 251 may connect the first hydraulic port 24a of the master cylinder 20 to the first hydraulic circuit 201, and the second backup flow path 252 may connect the second hydraulic port 24b of the master cylinder 20 to the second hydraulic circuit 202. Particularly, the first backup flow path 251 may be connected to the rear end of the first or second inlet valve 221a or 221b on the first hydraulic circuit 201, and the second backup flow path 252 may be connected to the rear end of the third or fourth inlet valve 221c or 221d on the second hydraulic circuit 202.

A first cut valve 261 configured to control the flow of the pressure medium may be disposed on the first backup flow path 251, and a second cut valve 262 configured to control the flow of the pressure medium may be disposed on the second backup flow path 252. The first and second cut valves 261 and 262 may be provided as a normally open solenoid valve that normally operates to open and operates to close the valve when receiving a close signal from the ECU.

Therefore, when the first and second cut valves 261 and 262 are closed, the hydraulic pressure supplied from the hydraulic supplier 100 may be supplied to the wheel cylinder 40 through the first and second hydraulic circuits 201 and 202. When the first and second cut valves 261 and 262 are opened, the hydraulic pressure supplied from the master cylinder 20 may be supplied to the wheel cylinder 40 through the first and second backup flow paths 251 and 252.

According to an embodiment, the electric brake system 1 may include a backup flow path pressure sensor PS1 configured to detect the hydraulic pressure of the master cylinder 20 and a flow path pressure sensor (PS2) configured to detect the hydraulic pressure of the first and second hydraulic circuits 201 and 202. For example, the backup flow path pressure sensor (PS1) may be disposed on the front end of the first cut valve 262 on the first backup flow path 251 to detect the hydraulic pressure generated from the master cylinder 20, and the flow path pressure sensor (PS2) may be disposed on the front end of any one inlet valve 221 between the first hydraulic circuit 201 and the second hydraulic circuit 202 to detect the hydraulic pressure applied to the first hydraulic circuit 201 and the second hydraulic circuit 202. Although the flow path pressure sensor (PS2) is illustrated to be disposed in the front end of the inlet valve 221 of the first hydraulic circuit 201, but the position of the flow path pressure sensor (PS2) is not limited thereto. The flow path pressure sensor (PS2) may be provided in various numbers or in various positions, if it is configured to detect the hydraulic pressure applied to the hydraulic circuit 201 and 202.

Hereinafter an operation of the electric brake system 1 according to a first embodiment will be described.

According to the first embodiment, the electric brake system 1 may operate the hydraulic supplier 100 with a low pressure mode and a high pressure mode. The low pressure mode and the high pressure mode may be switched according to the operation of the hydraulic control unit 200. In the high pressure mode, the hydraulic supplier 100 may provide a high hydraulic pressure without increasing the output of the motor 120, and reduce a load applied to the motor 120. Therefore, it may be possible to reduce the cost and weight of the brake system and it may be possible to secure the stable braking force and improve the durability and operational reliability of the brake system.

When the hydraulic piston 114 moves forward by the driving of the motor 120, the hydraulic pressure is generated in the first pressure chamber 112. As the hydraulic piston 114 moves more forward from an initial position, that is a working stroke of the hydraulic piston 114 is increased, a supply amount of the pressure medium transmitted to the wheel cylinders 40 may be increased and the braking pressure may be increased. However, since the hydraulic piston 114 has a valid stroke, there is a maximum pressure by the forward movement of the hydraulic piston 114.

A maximum pressure in the low pressure mode is less than a maximum pressure in the low pressure mode. The rate of pressure increase per stroke of hydraulic piston 114 in the high pressure mode is less than the rate of pressure increase per stroke of hydraulic piston 114 in the low pressure mode. This is because all of the pressure medium discharged from the first pressure chamber 112 may be not transmitted to the wheel cylinder 40, but some of the pressure medium may be transmitted to the second pressure chamber 113. A description thereof will be described with reference to FIG. 3.

Therefore, on an early stage of braking in which a braking response is important, it may be possible to use the low pressure mode in which the rate of pressure increase per stroke is great. On a late stage of braking in which the maximum braking force is important, it may be possible to use the high pressure mode in which the maximum pressure is great.

Figure 2:
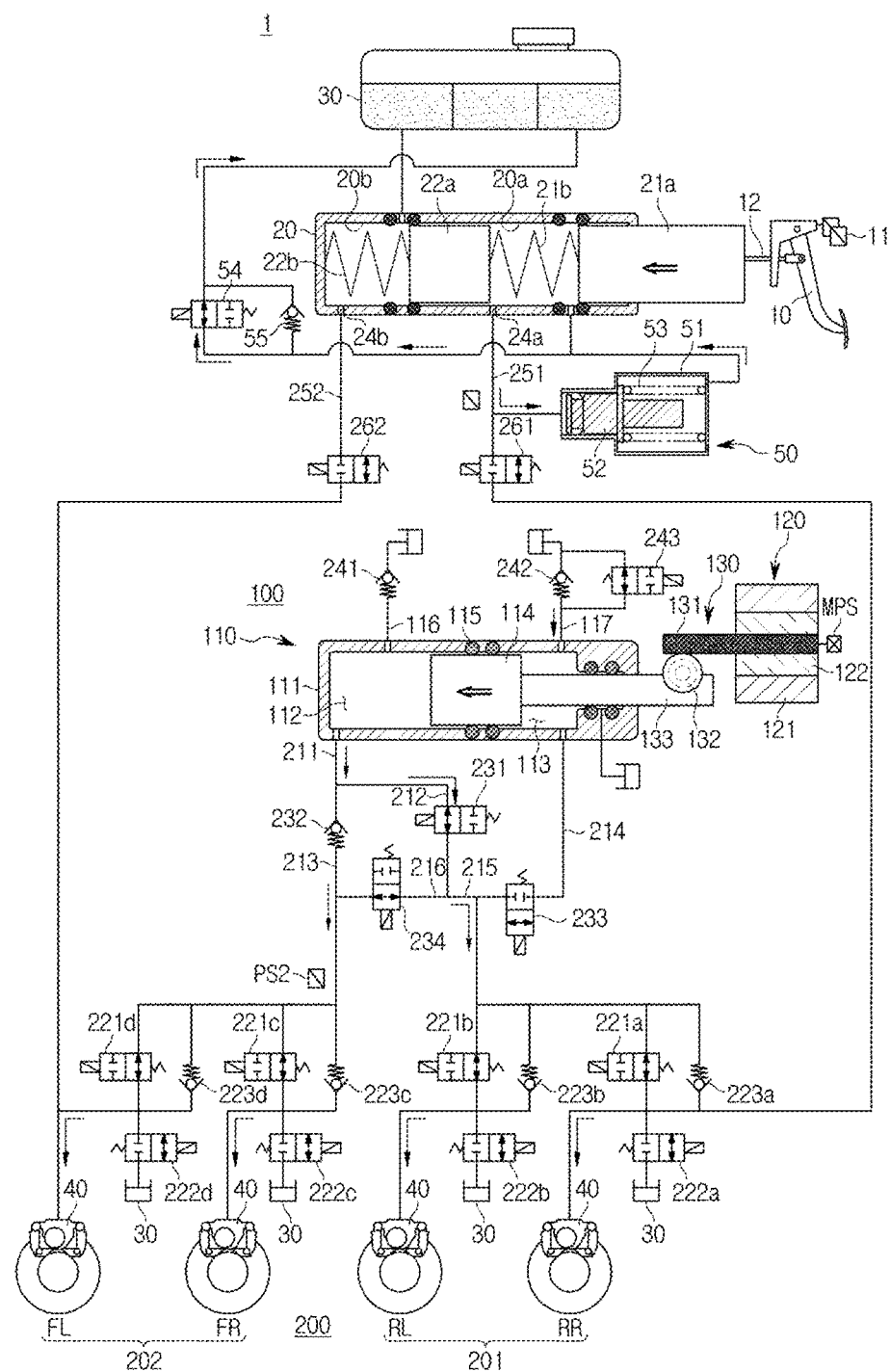
FIG. 2 is a hydraulic circuit diagram illustrating a state in which a hydraulic piston of the electric brake system according to the first embodiment moves forward and provides a braking pressure in a low pressure mode.
Figure 3:
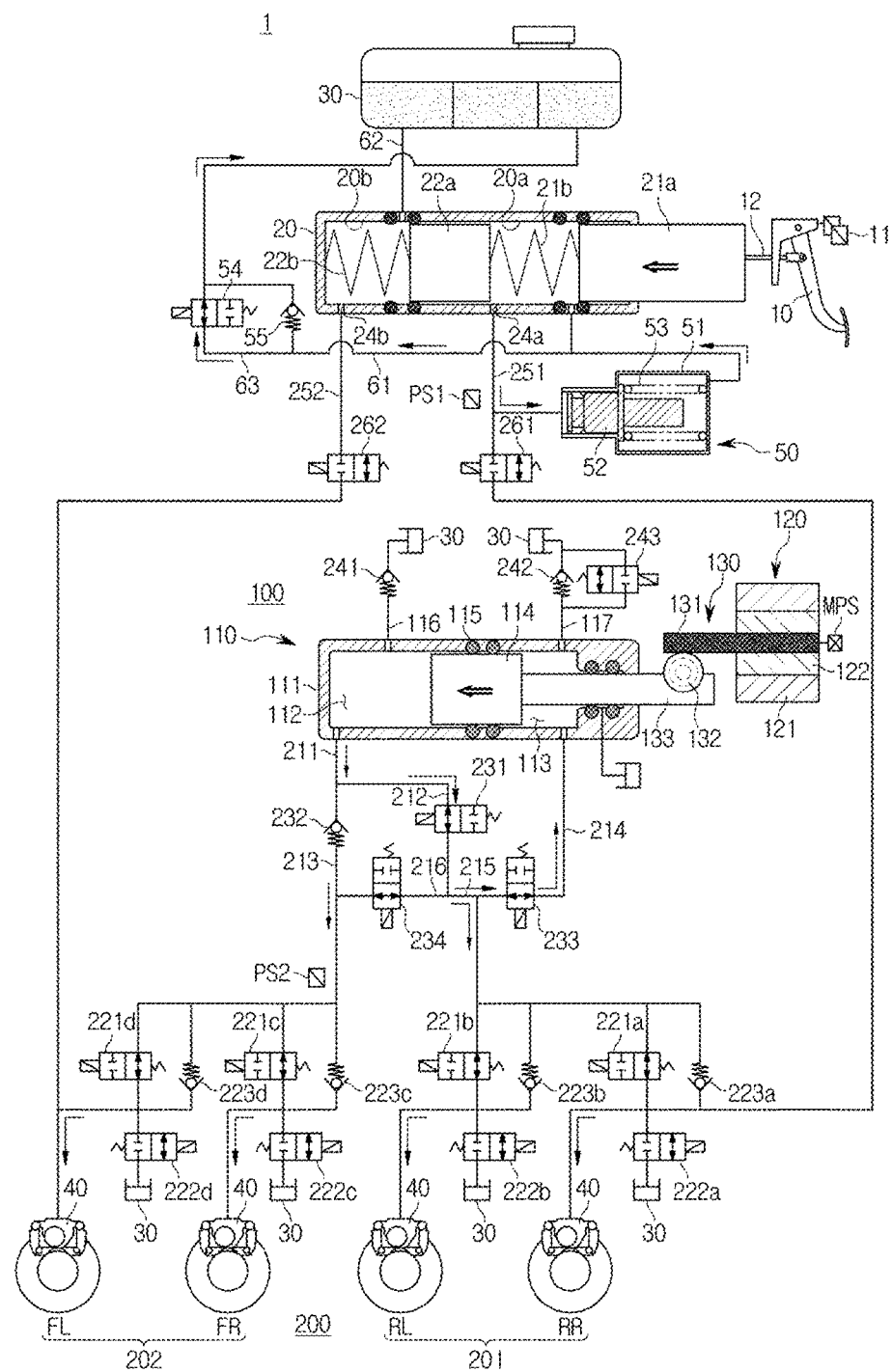
FIG. 3 is a hydraulic circuit diagram illustrating a state in which the hydraulic piston of the electric brake system according to the first embodiment moves forward and provides a braking pressure in a high pressure mode.

FIG. 2 is a hydraulic circuit diagram illustrating a state in which the hydraulic piston 114 of the electric brake system 1 according to the first embodiment moves forward and provides a braking pressure in the low pressure mode, and FIG. 3 is a hydraulic circuit diagram illustrating a state in which the hydraulic piston 114 of the electric brake system 1 according to the first embodiment moves forward and provides a braking pressure in the high pressure mode.

Referring to FIG. 2, when a driver presses the brake pedal 10 in the early stage of the braking, the motor 120 is rotated in one direction and the rotational force of the motor 120 is transmitted to the hydraulic pressure supply unit 110 by the power converter 130. As the hydraulic piston 114 of the hydraulic pressure supply unit 110 moves forward, the hydraulic pressure is generated in the first pressure chamber 112. The hydraulic pressure discharged from the first pressure chamber 112 is transmitted to the wheel cylinders 40 provided on the four wheels through the first hydraulic circuit 201 and the second hydraulic circuit 202 so as to generate the braking force.

Particularly, the hydraulic pressure supplied from the first pressure chamber 112 is directly transmitted to the two wheel cylinders 40 provided in the first hydraulic circuit 201 through the first hydraulic flow path 211, the second hydraulic flow path 212, and the fifth hydraulic flow path 215 connected to the first communication hole 111a. At this time, the first and second inlet valves 221a and 221b, which are installed on two flow paths diverged from the first hydraulic circuit 201, are opened and the first and second outlet valves 222a and 222b, which are installed on a flow path diverged from two flow paths diverged from the first hydraulic circuit 201, are maintained in the closed state. Therefore, it may be possible to prevent the hydraulic pressure from being leaked to the reservoir 30.

In addition, the hydraulic pressure supplied from the first pressure chamber 112 is directly transmitted to the two wheel cylinders 40 provided in the second hydraulic circuit 202 through the first hydraulic flow path 211 and the third hydraulic flow path 213, connected to the first communication hole 111a. At this time, the third and fourth inlet valves 221c and 221d, which are installed on two flow paths diverged from the third hydraulic flow path 213, are opened and the third and fourth outlet valves 222c and 222d, which are installed on a flow path diverged from two flow paths diverged from the second hydraulic circuit 202, are maintained in the closed state. Therefore, it may be possible to prevent the hydraulic pressure from being leaked to the reservoir 30.

Further, since the fourth valve 234 is switched to the open state, the fourth valve 234 may open the sixth hydraulic flow path 216. When the sixth hydraulic flow path 216 is opened, the hydraulic pressure supplied from the first pressure chamber 112 may be transmitted to the second hydraulic circuit 202 after passing through the first hydraulic flow path 211, the second hydraulic flow path 212, and the sixth hydraulic flow path 216, sequentially. In contrast, the hydraulic pressure supplied from the first pressure chamber 112 may be transmitted to the first hydraulic circuit 201 after passing through the first hydraulic flow path 211, the second hydraulic flow path 212, the sixth hydraulic flow path 216 and the fifth hydraulic flow path 215, sequentially.

At this time, since the third valve 233 is maintained in the closed state, the third valve 233 may block the fourth hydraulic flow path 214. Therefore, it may be possible to prevent the hydraulic pressure generated in the first pressure chamber 112 from being transmitted to the second pressure chamber 113 through the fourth hydraulic flow path 214 so as to improve the rate of pressure increase per stroke of the hydraulic piston 114. Accordingly, it may be possible to secure the quick braking response at the early stage of the braking.

In addition, when the hydraulic pressure of the pressure medium is generated by the hydraulic supplier 100, the first and second cut valve 261 and 262 disposed on the first and second the backup flow paths 251 and 252 may be closed, and thus it may be possible to prevent the hydraulic pressure discharged from the master cylinder 20 from being transmitted to the wheel cylinder 40. The hydraulic pressure generated in the master cylinder 20 due to the pedal effort of the brake pedal 10 may be transmitted to the simulator 50 connected to the master cylinder 20. In this time, the simulator valve 54 provided in the reservoir flow path 61 is opened and the pressure medium discharged from the first master chamber 20a of the master cylinder 20 is transmitted to the front side of the simulation piston 52 so as to move the simulation piston 52. Therefore, the reaction force spring 53 is compressed and the pressure medium accommodated in the simulation chamber 51 is transmitted to the reservoir 30 through the first reservoir flow path 61 opened by the simulator valve 54. By the elastic restoring force that is generated by the compression of the reaction force spring 53, it may be possible to provide the proper sense of the pedal to the driver by the application of the reaction force corresponding to the pedal effort.

The flow path pressure sensor (PS2) configured to detect the hydraulic pressure of at least one of the first hydraulic circuit 201 and the second hydraulic circuit 202 may detect the hydraulic pressure transmitted to the wheel cylinder 40. Accordingly, the flow path pressure sensor (PS2) may control the amount or the hydraulic pressure of the pressure medium transmitted to the wheel cylinder 40, by controlling the operation of the hydraulic supplier 100. When the hydraulic pressure transmitted to the wheel cylinder 40 is higher than a target pressure value according to the pedal effort of the brake pedal 10, the flow path pressure sensor (PS2) may open at least one of the first to fourth outlet valves 222 to control the hydraulic pressure so that the hydraulic pressure corresponds to the target pressure value.

According to the first embodiment, the hydraulic supplier 100 of the electric brake system 1 may be switched from the low pressure mode of FIG. 2 into the high pressure mode of FIG. 3 before the hydraulic piston 114 moves forward to the maximum.

Referring to FIG. 3, when the hydraulic pressure detected by the flow path pressure sensor (PS2) is higher than a predetermined pressure level, the ECU may switch the low pressure mode into the high pressure mode. In the high pressure mode, the third valve 233 is switched to the open state to open the fourth hydraulic flow path 214. Therefore, some of the hydraulic pressure generated in the first pressure chamber 112 may be transmitted to the second pressure chamber 113 after passing through the first hydraulic flow path 211, the second hydraulic flow path 212, the fifth hydraulic flow path 215 and the fourth hydraulic flow path 214, sequentially, and thus the hydraulic pressure may move the hydraulic piston 114 more forward while reducing the load applied to the motor 120.

Since some of the pressure medium discharged from the first pressure chamber 112 flows into the second pressure chamber 113 in the high pressure mode, the rate of pressure increase per stroke may decrease. However, since some of the hydraulic pressure generated in the first pressure chamber 112 is utilized to move the hydraulic piston 114 more forward, the maximum pressure of the pressure medium may increase. This is because the rate of volume change per stroke of the hydraulic piston 114 in the first pressure chamber 112 is relatively greater than the rate of volume change per stroke of the hydraulic piston 114 in the second pressure chamber 113 since the drive shaft 133 passes through the second pressure chamber 113.

In addition, since the hydraulic pressure is increased as the hydraulic piston 114 moves forward, a force, in which the hydraulic pressure of the first pressure chamber 112 moves the hydraulic piston 114 backward, is increased. Accordingly, the load applied to the motor 120 may be also increased. However, since the fourth hydraulic flow path 214 is opened by the control of the third valve 233, some of the pressure medium discharged from the first pressure chamber 112 may be transmitted to the second pressure chamber 113 and thus the hydraulic pressure may be generated in the second pressure chamber 113 thereby reducing the load applied to the motor 120.

At this time, the third dump valve 243 may be switched to a closed state. Since the third dump valve 243 is closed, the pressure medium in the first pressure chamber 112 may be rapidly introduced into the second pressure chamber 113 in the negative pressure state and the hydraulic pressure may be also applied to the second pressure chamber 113. However, as needed, the third dump valve 243 is maintained in the open state and thus the pressure medium in the second pressure chamber 113 may be controlled to be introduced into the reservoir 30.

Hereinafter, an operating state in which the hydraulic piston 114 moves backward to provide the braking pressure to the wheel cylinder 40 will be described.

Figure 4:
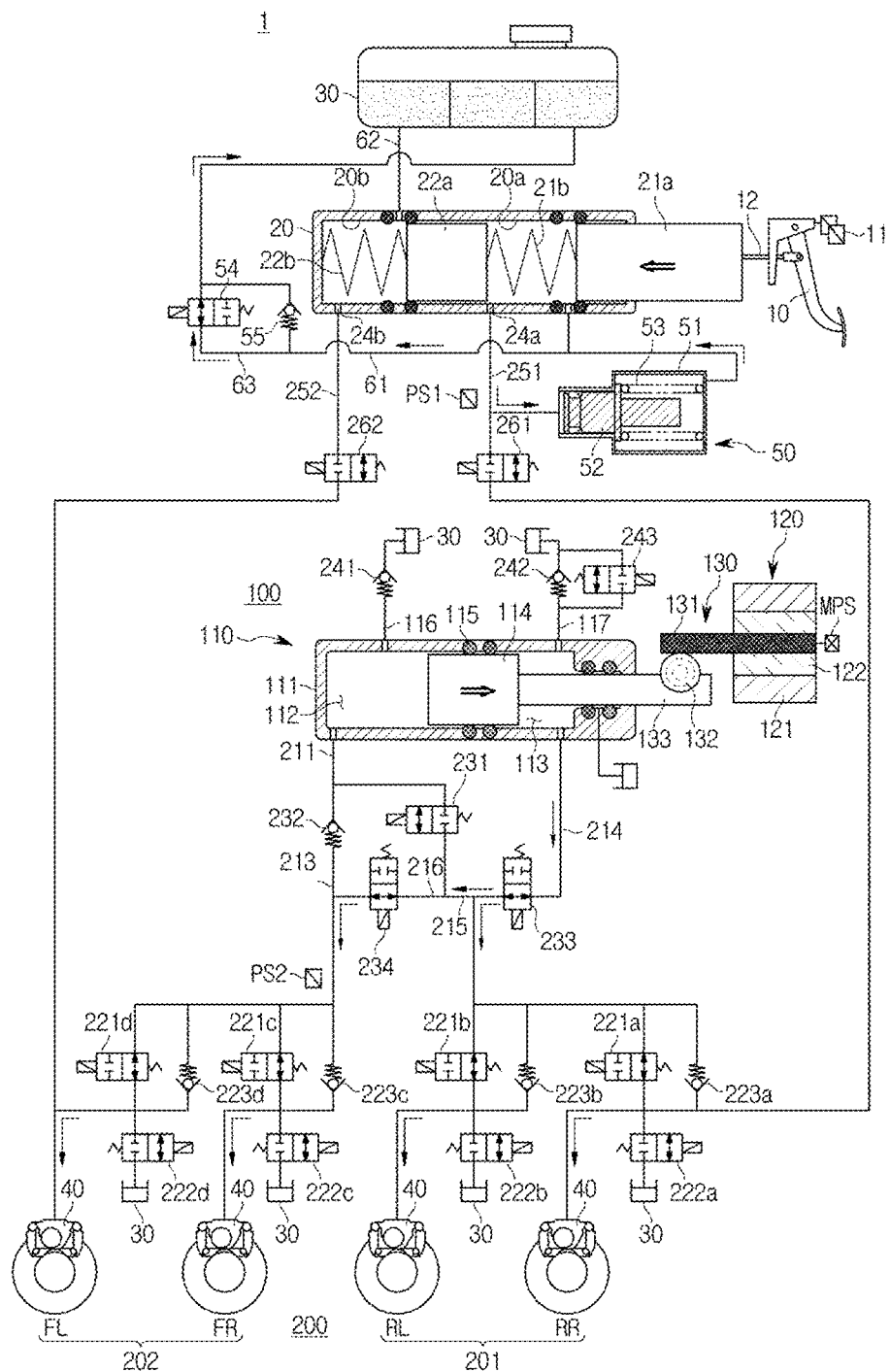
FIG. 4 is a hydraulic circuit diagram illustrating a state in which the hydraulic piston of the electric brake system according to the first embodiment moves backward and provides a braking pressure.

FIG. 4 is a hydraulic circuit diagram illustrating a state in which the hydraulic piston 114 of the electric brake system 1 according to the first embodiment moves backward and provides a braking pressure. Referring to FIG. 4, when a driver presses the brake pedal 10 in the early stage of the braking, the motor 120 is rotated in the opposite direction and the rotational force of the motor 120 is transmitted to the hydraulic pressure supply unit 110 by the power converter 130. As the hydraulic piston 114 of the hydraulic pressure supply unit 110 moves backward, the hydraulic pressure is generated in the second pressure chamber 113. The hydraulic pressure discharged from the second pressure chamber 113 is transmitted to the wheel cylinders 40 provided on the four wheels through the first hydraulic circuit 201 and the second hydraulic circuit 202 so as to generate the braking force.

Particularly, the hydraulic pressure supplied from the second pressure chamber 113 is directly transmitted to the wheel cylinders 40 of the first hydraulic circuit 201 through the fourth hydraulic flow path 214, and the fifth hydraulic flow path 215 connected to the second communication hole 111b. At this time, the first and second inlet valves 221a and 221b are opened and the first and second outlet valves 222a and 222b are maintained in the closed state. Therefore, it may be possible to prevent the hydraulic pressure from being leaked to the reservoir 30.

In addition, the hydraulic pressure supplied from the second pressure chamber 113 is directly transmitted to the wheel cylinders 40 of the second hydraulic circuit 202 through the fourth hydraulic flow path 214, the fifth hydraulic flow path 215, and the sixth hydraulic flow path 216 connected to the second communication hole 111*b*. At this time, the third and fourth inlet valves 221*c* and 221*d* are opened and the third and fourth outlet valves 222*c* and 222*d* are maintained in the closed state. Therefore, it may be possible to prevent the hydraulic pressure from being leaked to the reservoir 30.

At this time, since the third valve 233 and the fourth valve 234 are switched to the open state, the fourth hydraulic flow path 214 and the sixth hydraulic flow path 216 may be opened.

Further, since the first valve 231 is maintained in the closed state, the first valve 231 may block the second hydraulic flow path 212. Therefore, it may be possible to prevent the hydraulic pressure generated in the second pressure chamber 113 from being transmitted to the first pressure chamber 112 through the second hydraulic flow path 212 so as to improve the rate of pressure increase per stroke of the hydraulic piston 114. Accordingly, it may be possible to secure the quick braking response at the early stage of the braking.

The third dump valve 243 may be switched to the closed state. Since the third dump valve 243 is closed, the hydraulic pressure of the pressure medium may be rapidly and stably generated in the second pressure chamber 113, and the hydraulic pressure generated in the second pressure chamber 113 may be discharged to only the fourth hydraulic flow path 214.

Hereinafter, an operation state of releasing the braking pressure in the normal operating state of the electronic brake system 1 according to the first embodiment will be described.

Figure 5:
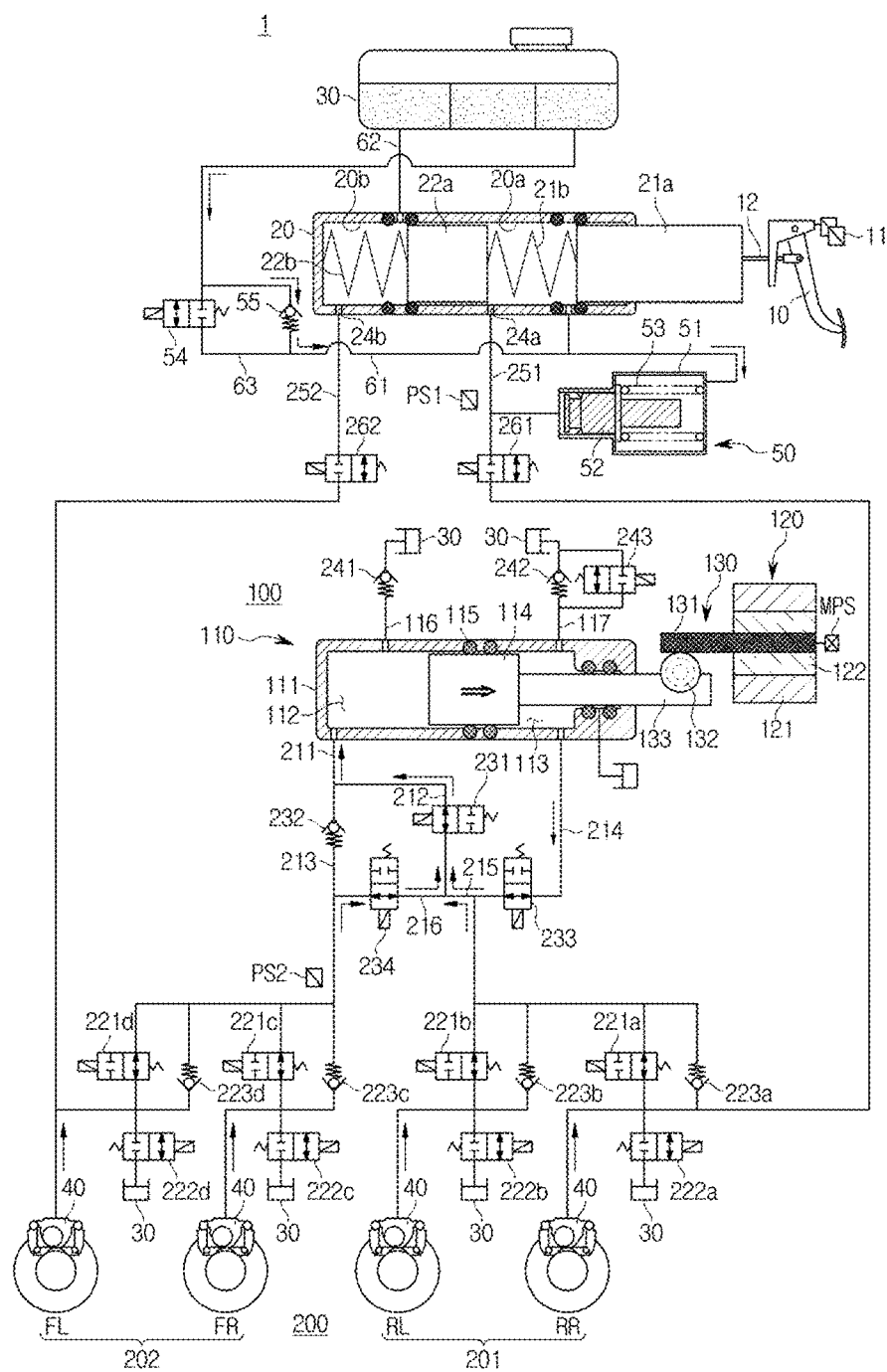
FIG. 5 is a hydraulic circuit diagram illustrating a state in which the hydraulic piston of the electric brake system according to the first embodiment moves backward and provides a braking pressure in the high pressure mode.
Figure 6:
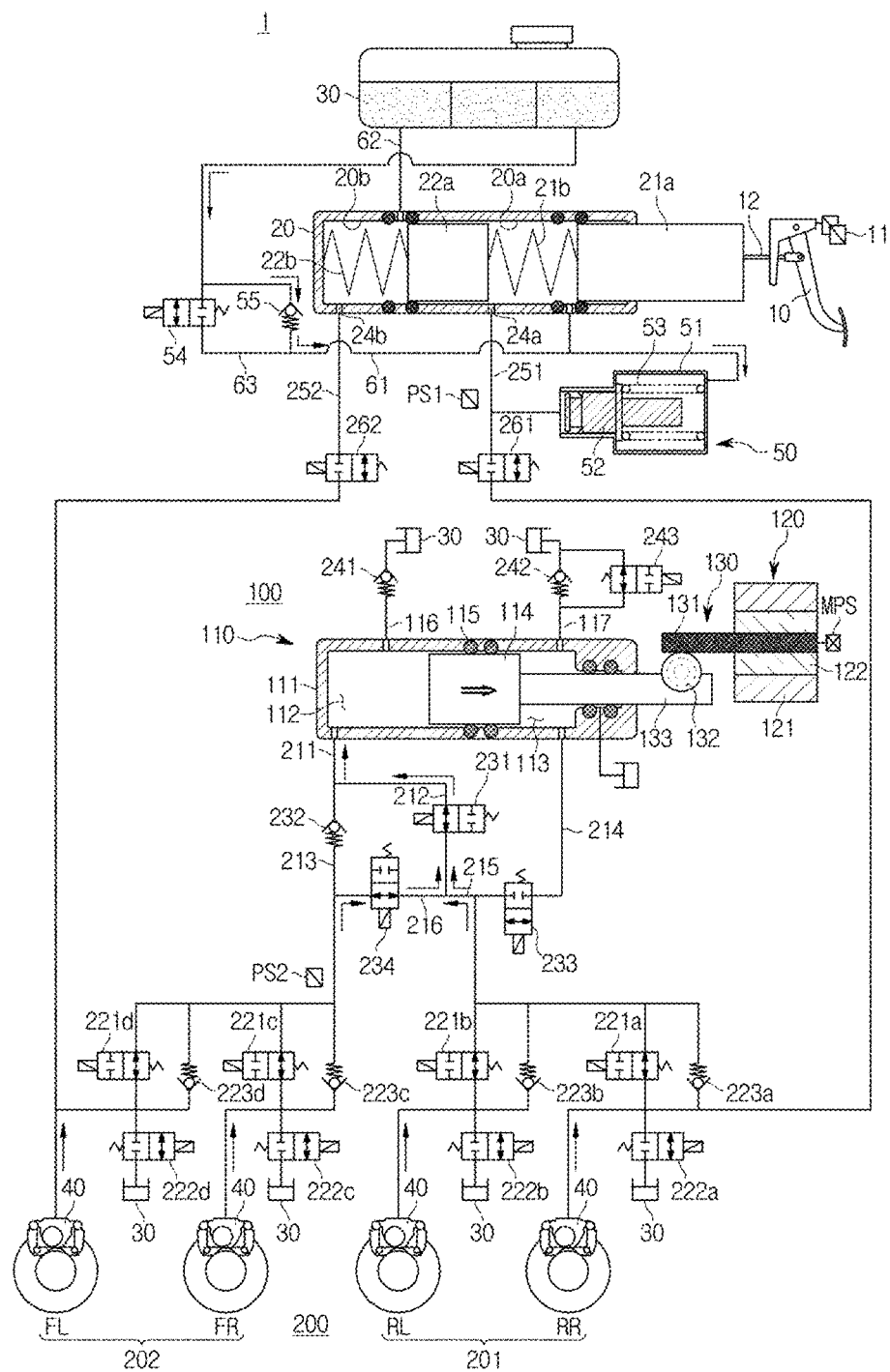
FIG. 6 is a hydraulic circuit diagram illustrating a state in which the hydraulic piston of the electric brake system according to the first embodiment moves backward and provides a braking pressure in a low pressure mode.

FIG. 5 is a hydraulic circuit diagram illustrating a state in which the hydraulic piston 114 of the electric brake system 1 according to the first embodiment moves backward and provides a braking pressure in a high pressure mode and FIG. 6 is a hydraulic circuit diagram illustrating a state in which the hydraulic piston 114 of the electric brake system 1 according to the first embodiment moves backward and provides a braking pressure in a low pressure mode.

Referring to FIG. 5, when the pedal effort applied to the brake pedal 10 is released, the motor 120 may generate the rotational force in a direction opposite to the braking direction and transmit the rotational force to the power converter 130. The worm shaft 131, the worm wheel 132, and the drive shaft 133 of the power converter 130 may rotate in the direction opposite to the braking direction to move the hydraulic piston 114 back to its original position. Therefore, it may be possible to release the hydraulic pressure of the first pressure chamber 112 and to generate the negative pressure. At the same time, the pressure medium discharged from the wheel cylinder 40 may be transmitted to the first pressure chamber 112 through the first and second hydraulic circuits 201 and 202.

Particularly, the negative pressure generated in the first pressure chamber 112 releases the pressure of the wheel cylinders 40 provided in the first hydraulic circuit 201 through the first hydraulic flow path 211, the second hydraulic flow path 212, and the fifth hydraulic flow path 215 connected to the first communication hole 111*a*. At this time, the first and second inlet valves 221*a* and 221*b*, which are installed on two flow paths diverged from the first hydraulic circuit 201, are opened and the first and second outlet valves 222*a* and 222*b*, which are installed on a flow path diverged from two flow paths diverged from the first hydraulic circuit 201, are maintained in the closed state. Therefore, it may be possible to prevent the pressure medium of the reservoir 30 from being introduced into the first pressure chamber 112.

In addition, the negative pressure generated in the first pressure chamber 112 releases the pressure of the wheel cylinders 40 provided in the second hydraulic circuit 202 through the first hydraulic flow path 211 and the third hydraulic flow path 213, connected to the first communication hole 111*a*. At this time, the third and fourth inlet valves 221*c* and 221*d*, which are installed on two flow paths diverged from second hydraulic circuit 202, are opened and the third and fourth outlet valves 222*c* and 222*d*, which are installed on a flow path diverged from two flow paths diverged from the second hydraulic circuit 202, are maintained in the closed state. Therefore, it may be possible to prevent the pressure medium of the reservoir 30 from being introduced into the first pressure chamber 112.

In addition, since the third valve 233 is switched to the open state, the fourth hydraulic flow path 214 may be opened and thus the first pressure chamber 112 and the second pressure chamber 113 may be communicated with each other.

That is, it is required that the hydraulic piston 114 moves backward to generate the negative pressure in the first pressure chamber 112. However, when the hydraulic pressure of the pressure medium is present in the second pressure chamber 113, a resistance may occur against the backward movement of the hydraulic piston 114. Therefore, the third valve 233 may be switched to the open state and thus the first pressure chamber 112 and the second pressure chamber 113 may be communicated with each other, thereby supplying the hydraulic pressure in the second pressure chamber 113 to the first pressure chamber 112.

At this time, the third dump valve 243 may be switched to the closed state. Since the third dump valve 243 is closed, the pressure medium in the second pressure chamber 113 may be discharged to only the fourth hydraulic flow path 214. However, as needed, the third dump valve 243 is maintained in the open state and thus the pressure medium in the second pressure chamber 113 may be controlled to be introduced into the reservoir 30.

In addition, when the negative pressure transmitted to the first and second hydraulic circuits 201 and 202 is measured to be higher than a target pressure release value according to a release amount of the brake pedal 10, it may be possible to open at least one of the first to fourth outlet valve 222 to control the negative pressure so that the negative pressure corresponds to the target pressure value. In addition, the first and second cut valve 261 and 262 provided in the first and second backup flow path 251 and 252 are closed, and thus it may be possible to prevent the negative pressure generated in the master cylinder 20 from being transmitted to the hydraulic control unit 200.

As the high pressure mode of FIG. 5, the pressure medium in the second pressure chamber 113 as well as the pressure medium in the wheel cylinder 40 may be supplied to the first pressure chamber 112 by the negative pressure in the first pressure chamber 112 that is generated by the backward movement of the hydraulic piston 114. Therefore, the pressure reduction rate of the wheel cylinder 40 may be small. Therefore, it may be difficult to quickly release the braking pressure in the high pressure mode. For this reason, the braking pressure release operation of the high pressure mode is only used in the high pressure condition of the braking pressure, and thus when the braking pressure is equal to or less than a predetermined level, it may be possible to switch the operation into the braking pressure release operation of the low pressure mode so as to rapidly release of the braking pressure, as illustrated in FIG. 6.

Referring to FIG. 6, when the braking pressure is released in the low pressure mode, the third dump valve 243 may be switched into the open state or maintained in the open state so as to communicate the second pressure chamber 113 with the reservoir 30, rather than that the third valve 233 may be maintained in the closed state or switched into the closed state to close the fourth hydraulic flow path 214.

Upon releasing the braking pressure in the low pressure mode, the negative pressure generated in the first pressure chamber 112 is used to collect the pressure medium of the wheel cylinder 40, and thus the rate of the pressure reduction per stroke of the hydraulic piston 114 may be increased compared with the release of the braking pressure in the high pressure mode. In this time, the hydraulic pressure generated in the second pressure chamber 113 by the backward movement of the hydraulic piston 114 is transmitted to the reservoir 30 since the third dump valve 243 is switched to the opened state.

Unlike FIG. 6, it may be possible to release the braking pressure of the wheel cylinder 40 although the hydraulic piston 114 moves forward.

Figure 7:
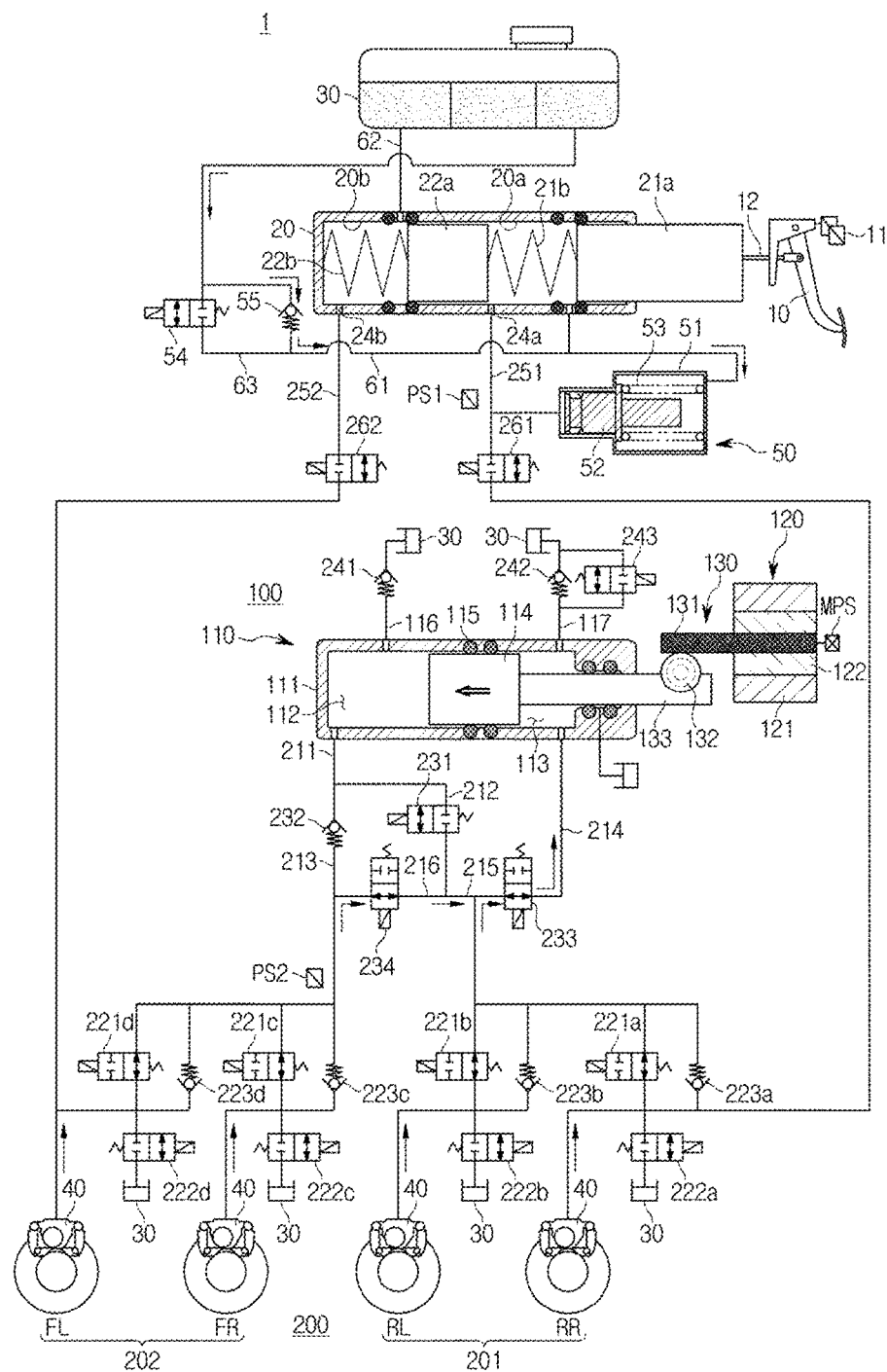
FIG. 7 is a hydraulic circuit diagram illustrating a state in which the hydraulic piston of the electric brake system according to the first embodiment moves forward and releases a braking pressure.

FIG. 7 is a hydraulic circuit diagram illustrating a state in which the hydraulic piston 114 of the electric brake system1 according to the first embodiment moves forward and releases a braking pressure.

Referring to FIG. 7, when the pedal effort applied to the brake pedal 10 is released, the motor 120 may generate the rotational force in a direction opposite to the braking direction and transmit the rotational force to the power converter 130. The worm shaft 131, the worm wheel 132, and the drive shaft 133 of the power converter 130 may rotate in the direction opposite to the braking direction to move the hydraulic piston 114 back to its original position. Therefore, it may be possible to release the hydraulic pressure of the first pressure chamber 112 and to generate the negative pressure. At the same time, the pressure medium discharged from the wheel cylinder 40 may be transmitted to the second pressure chamber 113 through the first and second hydraulic circuits 201 and 202.

Particularly, the negative pressure generated in the second pressure chamber 113 releases the pressure of the wheel cylinders 40 provided in the first hydraulic circuit 201 through the fourth hydraulic flow path 214 and the fifth hydraulic flow path 215 connected to the second communication hole 111b. At this time, the first and second inlet valves 221a and 221b, which are installed on two flow paths diverged from the first hydraulic circuit 201, are opened and the first and second outlet valves 222a and 222b, which are installed on a flow path diverged from two flow paths diverged from the first hydraulic circuit 201, are maintained in the closed state. Therefore, it may be possible to prevent the pressure medium of the reservoir 30 from being introduced into the second pressure chamber 113.

In addition, the negative pressure generated in the second pressure chamber 113 releases the pressure of the wheel cylinders 40 provided in the second hydraulic circuit 202 through the fourth hydraulic flow path 214, the fifth hydraulic flow path 215, and the sixth hydraulic flow path 216 connected to the second communication hole 111b. At this time, the third and fourth inlet valves 221c and 221d, which are installed on two flow paths diverged from the second hydraulic circuit 202, are opened and the third and fourth outlet valves 222c and 222d, which are installed on a flow path diverged from two flow paths diverged from the second hydraulic circuit 202, are maintained in the closed state. Therefore, it may be possible to prevent the pressure medium of the reservoir 30 from being introduced into the second pressure chamber 113.

At this time, since the third valve 233 is switched to the open state, the fourth hydraulic flow path 214 may be opened. Since the fourth valve 234 is switched to the open state, the sixth hydraulic flow path 216 may be opened.

In addition, since the third dump valve 243 is switched to the closed state, the negative pressure generated in the second chamber 113 may quickly collect the pressure medium of the wheel cylinder 40.

In addition, when the negative pressure transmitted to the first and second hydraulic circuits 201 and 202 is measured to be higher than a target pressure release value according to a release amount of the brake pedal 10, it may be possible to open at least one of the first to fourth outlet valve 222 to control the negative pressure so that the negative pressure corresponds to the target pressure value. In addition, the first and second first and second cut valve 261 and 262 provided in the first and second backup flow path 251 and 252 are closed, and thus it may be possible to prevent the negative pressure generated in the master cylinder 20 from being transmitted to the hydraulic control unit 200.

Hereinafter, an operating state in which the electronic brake system 1 according to the embodiment is not operated normally will be described.

Figure 8:
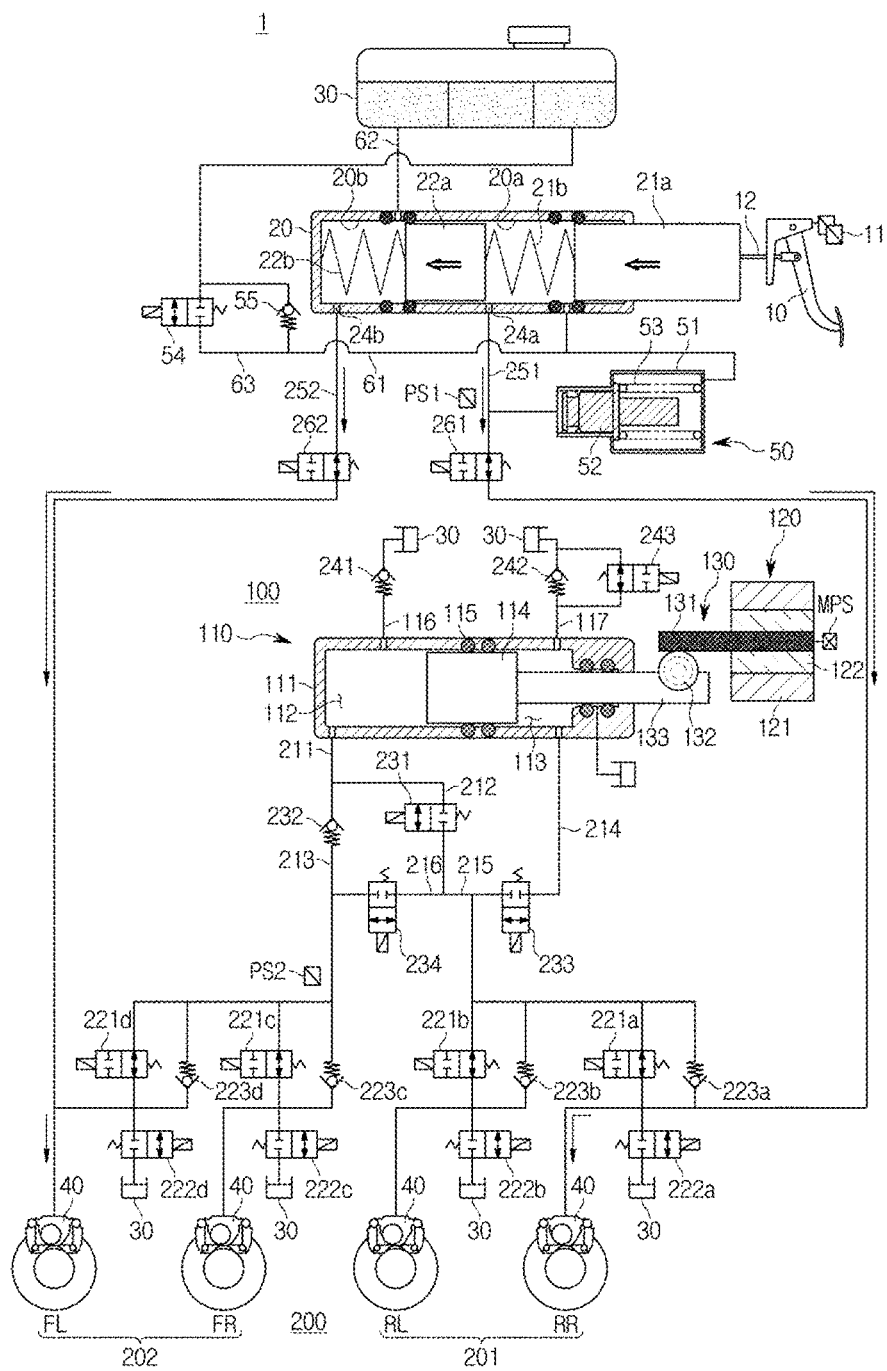
FIG. 8 is a hydraulic circuit diagram illustrating a state in which the electric brake system according to the first embodiment is abnormally operated.

FIG. 8 is a hydraulic circuit diagram illustrating a state in which the electric brake system 1 according to the first embodiment is abnormally operated.

Referring to FIG. 8, when the electronic brake system 1 is not operated normally, the valves are controlled to be a braking initial state corresponding to a non-operation state. When the driver presses the brake pedal 10, the first piston 21a connected to the brake pedal 10 moves forward, and the second piston 22a moves forward due to the movement of the first piston 21a. Accordingly, hydraulic pressure may be generated in the pressure medium accommodated in the first master chamber 20a and the second master chamber 20b, and then the hydraulic pressure generated in the first and second master chambers 20a and 20b may be transmitted to the wheel cylinder 40 through the first and second backup flow paths 251 and 252 to implement the braking force.

The first and second cut valves 261 and 262 provided on the first and second backup flow paths 251 and 252 are provided as a normally open solenoid valve, and the simulator valve 54 and the outlet valve 222 are provided as a normally closed solenoid valve. Therefore, it may be possible to directly transmit the hydraulic pressure generated in the first and second master chambers 20a and 20b of the master cylinder 20, to the wheel cylinder 40 and thus it may be possible to improve the braking stability and to secure the rapid braking.

Hereinafter, an inspection mode operation of the electronic brake system 1 according to the first embodiment will be described.

The inspection mode includes a mode configured to inspect whether a leakage occurs in the simulator 50, and a mode configured to inspect whether air is present in the master cylinder 20.

The inspection mode may inspect the presence of the leakage in the master cylinder 20 or the presence of the leakage in the simulator 50. The brake system 1 according to the embodiment may periodically or frequently inspect whether the apparatus is operated normally, by performing the inspection mode before the driver starts driving, during the driver stops the vehicle or during the driver drives the vehicle.

Figure 9:
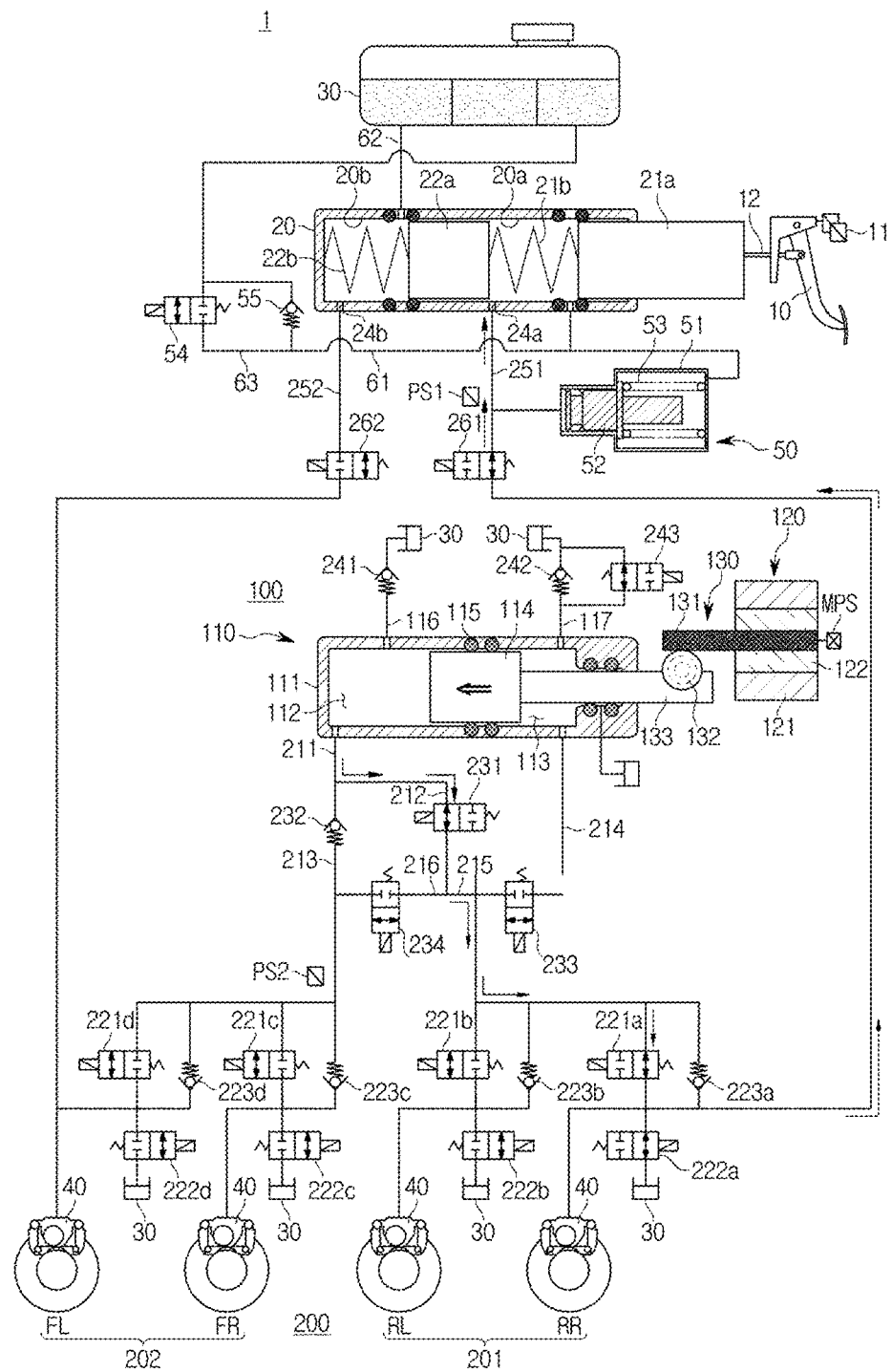
FIG. 9 is a hydraulic circuit diagram illustrating a state in which the electric brake system according to the first embodiment is in an inspection mode.

FIG. 9 is a hydraulic circuit diagram illustrating a state in which the electric brake system 1 according to the first embodiment inspects the presence of the leakage in the master cylinder 20 or the presence of the leakage in the simulator 50.

In the inspection mode of the brake system 1, the valves may be controlled to be a braking initial state corresponding to a non-operation state and the hydraulic pressure may be provided to only the first backup flow path 251 connected to the simulator 50 between the first and second backup flow paths 251 and 252. Therefore, the second cut valve 262 may be switched into the closed state to prevent the hydraulic pressure discharged from the hydraulic supplier 100 from being transmitted to the master cylinder 20 along the second backup flow path 252. In addition, since the simulator valve 54 is switched into the closed state, the hydraulic pressure, which is transmitted from the hydraulic supplier 100 to the master cylinder 20, may be prevented from being leaked to the reservoir 30 through the simulator 50 and the first reservoir flow path 61.

In the inspection mode, after the hydraulic pressure is generated by the hydraulic supplier 100, the ECU may identify the presence of the leakage in the master cylinder 20 or the presence of the leakage in the simulator 50, by analyzing a pressure value of the master cylinder 20 that is measured by the flow path pressure sensor (PS2). By comparing a hydraulic pressure value of the pressure medium, which is estimated based on an operation amount of the hydraulic supplier 100, with a real internal pressure of the first master chamber 20a measured by the flow path pressure sensor (PS2), the ECU may inspect the presence of the leakage or the air in the master cylinder 20, and the presence of the leakage in the simulator 50. Particularly, after the hydraulic pressure value that is calculated and estimated based on the operation amount of the hydraulic supplier 100 is compared with the real hydraulic pressure value of the master cylinder 20 that is measured by the flow path pressure sensor (PS2), when two hydraulic pressure values are identical to each other, it may be identified that the leakage does not occur in the master cylinder 20 and the simulator 50 and the air is not present in the master cylinder 20. In addition, when the real hydraulic pressure value of the master cylinder 20 that is measured by the flow path pressure sensor (PS2) is less than the hydraulic pressure value that is calculated and estimated based on the operation amount of the hydraulic supplier 100, it may be identified that the leakage occurs in the master cylinder 20 or the simulator 50 or the air is present in the master cylinder 20 since some of the hydraulic pressure of the pressure medium supplied to the first master chamber 20a is loss, and then it may be possible to inform the driver of information related to the leak.

FIG. 9 illustrates the case in which the hydraulic pressure is generated in the first pressure chamber 112 due to the forward movement of the hydraulic piston 114 of the hydraulic supplier 100 and the inspection mode is performed by opening the first valve 231, but is not limited thereto. It should be understood that a case, in which the hydraulic pressure is generated in the second pressure chamber 113 due to the backward movement of the hydraulic piston 114 and the inspection mode is performed by opening the third valve 233, is the same as the above mentioned case.

According to an embodiment, the electric brake system 1 may be configured to realize a selective braking by individually controlling the hydraulic pressure of each wheel cylinder 40. For example, when it is needed to realize the selective braking on the wheel cylinder 40 in the first inlet valve 221a side among the four inlet valves 221a, 221b, 221c, and 221d and the first outlet valve 222a side, the electric brake system 1 may generate the hydraulic pressure in the first pressure chamber 112 as the hydraulic piston 114 moves forward. The first inlet valve 221a may be controlled to be the open state and thus the hydraulic pressure, which is transmitted to the first hydraulic circuit 201 through the hydraulic pressure flow path and the valve, may be transmitted to the wheel cylinder 40 connected to the first inlet valve 221a, thereby generating the braking force.

At this time, other second to fourth inlet valves 221b, 221c and 221d are controlled to be the closed state, and the first to fourth outlet valve 222a, 222b, 222c, and 222d also are maintained in the closed state. The third dump valve 243 is controlled to be the open state and thus it may be possible to fill the second pressure chamber 113 in the negative pressure state with the pressure medium from the reservoir 30 through the second dump flow path 117.

On the contrary, the electric brake system 1 may selectively control the hydraulic pressure of the wheel cylinder 40 even when the hydraulic piston 114 moves backward. For example, the electric brake system 1 may generate the hydraulic pressure in the second pressure chamber 113 and control the first inlet valve 221a to be the open state, and thus the hydraulic pressure, which is transmitted to the first hydraulic circuit 201 through the hydraulic flow path and the valve, may be transmitted to the wheel cylinder 40 in the first inlet valve 221a and the first outlet valve 222a side, thereby generating the braking force.

At this time, other second to fourth inlet valves 221b, 221c and 221d are controlled to be the closed state, and the first to fourth outlet valve 222a, 222b, 222c, and 222d also are maintained in the closed state.

According to an embodiment, the electric brake system 1 may control the motor 120 and each valves independently of each other. Therefore, the electric brake system 1 may selectively transmit or discharge the hydraulic pressure to the wheel cylinder 40 of each vehicle wheels RL, RR, FL and FR according to a required pressure, and thus it may be possible to realize accurate control on the braking pressure such as anti-lock braking system (ABS).

According to an embodiment, the electric brake system 1 may discharge braking pressure, which is transmitted to a target wheel cylinder 40, through first to fourth outlet valve 222a, 222b, 222c and 222d. This is referred to as "dump mode". For example, when it is needed to implement a dump mode on the wheel cylinder 40 in the fourth inlet valve 221d and fourth outlet valve 222d side, the first to fourth inlet valves 221a, 221b, 221c and 221d may be controlled to be the closed state, and the first to third outlet valve 222a, 222b and 222c may be also controlled to be the closed state. Therefore, only fourth outlet valve 222d may be controlled to be the open state and thus the hydraulic pressure of the wheel cylinder 40 in the fourth inlet valve 221d and fourth outlet valve 222d side may be discharged to the reservoir 30 through the fourth outlet valve 222d.

The reason that the hydraulic pressure of the wheel cylinder 40 is discharged to the reservoir 30 through the outlet valve 222 is that the internal pressure of the reservoir 30 is less than the pressure of the wheel cylinder 40. The pressure of the reservoir 30 is typically atmospheric pressure, but the pressure of the wheel cylinder 40 is higher atmospheric pressure, and thus when the outlet valve 222 is opened, the hydraulic pressure of the wheel cylinder 40 may be quickly discharged to the reservoir 30.

Although not shown in the drawing, while the fourth outlet valve 222d is opened to discharge the hydraulic pressure of the wheel cylinder 40, the first to third inlet valves 221a, 221b and 221c may be maintained in the open state so as to supply the hydraulic pressure to the remaining three wheels.

As described above, according to an embodiment, the electric brake system 1 may control an operation of each valves 221a, 221 b, 221c, 221d, 222a, 222b, 222c, 222d, 233, 235, 236 and 243 of the hydraulic control unit 200, independently of each other. Therefore, the electric brake system 1 may selectively transmit or discharge the hydraulic pressure to the wheel cylinder 40 of each vehicle wheels RL, RR, FL and FR according to a required pressure, and thus it may be possible to realize accurate control on the braking pressure.

Further, according to an embodiment, the electric brake system 1 may perform a balance mode configured to balance the first pressure chamber 112 and the second pressure chamber 113. The balance mode may be performed when the pressure of the first pressure chamber 112 is not balanced with the pressure of the second pressure chamber 113. For example, when the leakage occurs since the hydraulic supplier 100 is frequently operated, or when the ABS is suddenly performed, the pressure balance between the first pressure chamber 112 and the second pressure chamber 113 may be broken, and thus the malfunction may occur since the hydraulic piston 114 is not placed in an estimated position.

In the balanced mode, a balancing process may be performed to balance the pressure by communicating the first pressure chamber 112 with the second pressure chamber 113 of the hydraulic pressure supply unit 110. The ECU may identify whether the pressure is unbalanced or not, by detecting the hydraulic pressure of the first hydraulic circuit 201 and the second hydraulic circuit 202 by using the flow path pressure sensor (PS2).

For example, when the pressure of the first pressure chamber 112 is greater than the pressure of the second pressure chamber 113, it may be possible to balance between the pressure of the first and second pressure chambers 112 and 113, by communicating the first pressure chamber 112 with the second pressure chamber 113.

For this, in the balance mode, the hydraulic flow path and the valve of the hydraulic control unit 200, particularly, the first valve 231 and the third valve 233 may be controlled to be the open state and thus the second hydraulic flow path 212 and the fourth hydraulic flow path 214 may be opened. That is, the first hydraulic flow path 211, the second hydraulic flow path 212, the fifth hydraulic flow path 215 and the fourth hydraulic flow path 214 may be opened and thus the first pressure chamber 112 and the second pressure chamber 113 may be communicated with other, thereby balancing the pressure of the first pressure chamber 112 with the pressure of the second pressure chamber 113.

At this time, the first to fourth inlet valves 221 may be controlled to be the closed state and the motor 120 may be rotated to partially move the hydraulic piston 114 forward or backward, thereby quickly performing the balance mode.

Hereinafter, an electric brake system 2 according to a second embodiment of will be described.

In the following description of the electric brake system 2 according to the second embodiment, except for an additional description with a different reference numeral, a description of the same parts as those shown in the electric brake system 1 according to the first embodiment will be omitted to prevent duplication.

Figure 10:
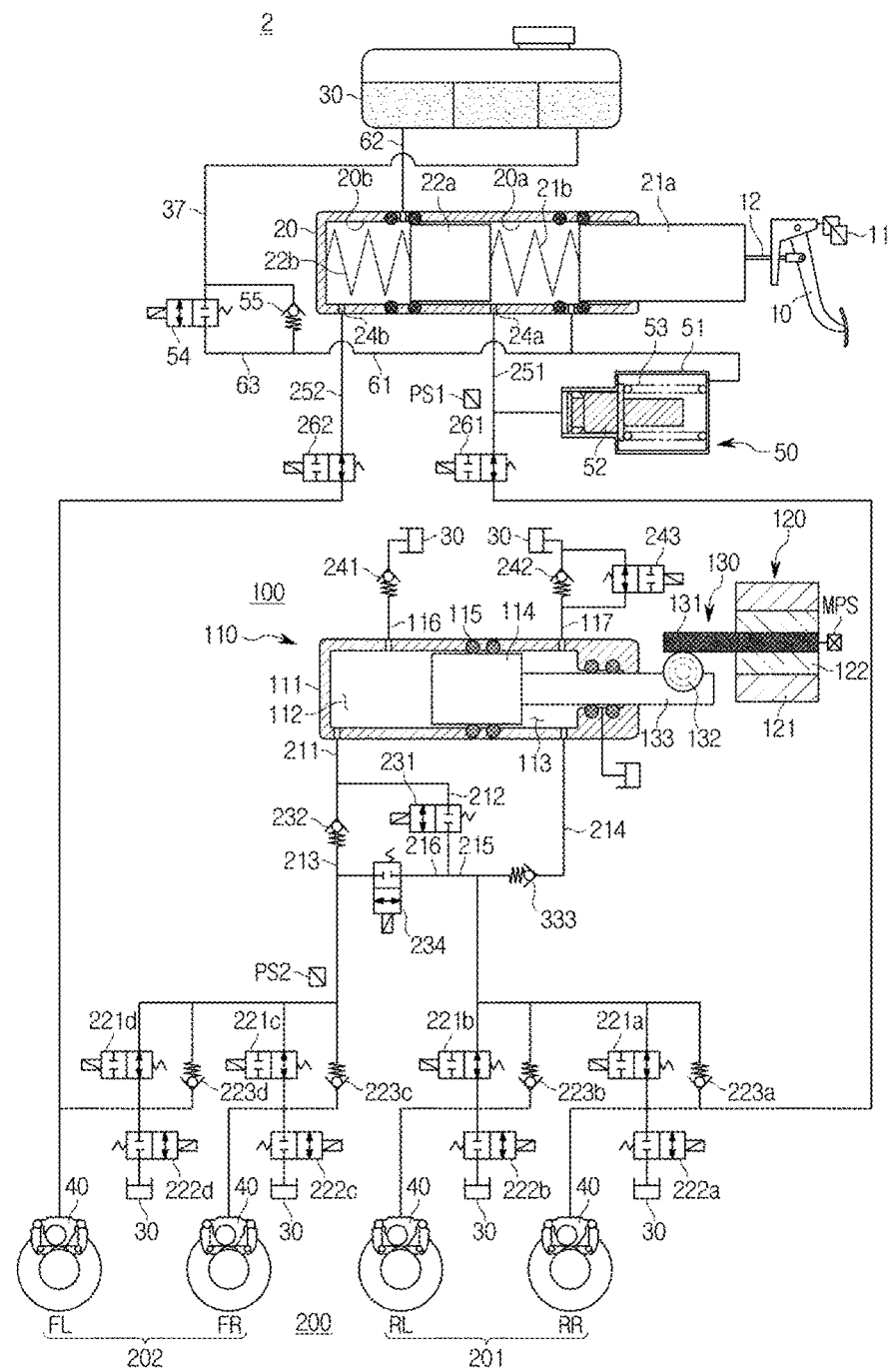
FIG. 10 is a hydraulic circuit diagram illustrating an electric brake system according to a second embodiment.

FIG. 10 is a hydraulic circuit diagram illustrating an electric brake system 2 according to the second embodiment.

Referring to FIG. 10, according to the second embodiment, a first hydraulic flow path 211 of the electric brake system 2 may connect a first pressure chamber 112 to first and second hydraulic circuits 201 and 202. The first hydraulic flow path 211 may be branched into a second hydraulic flow path 212 and a third hydraulic flow path 213. The third hydraulic flow path 213 may be connected to the second hydraulic circuit 202. Therefore, the hydraulic pressure generated in the first pressure chamber 112 by the forward movement of the hydraulic piston 114 may be transmitted to the second hydraulic circuit 202 through the first hydraulic flow path 211 and the third hydraulic flow path 213. The hydraulic pressure may be transmitted to the first hydraulic circuit 201 through the first hydraulic flow path 211, the second hydraulic flow path 212, and a fifth hydraulic flow path 215 described later.

A first valve 231 and a second valve 232 configured to control the flow of the pressure medium may be provided on the second hydraulic flow path 212 and the third hydraulic flow path 213, respectively.

The first valve 231 may employ a two-way valve configured to control the flow of the pressure medium transmitted through the second hydraulic flow path 212. The first valve 231 may be provided as a normally closed solenoid valve that normally operates to close and operates to open the valve when receiving an electrical signal from the ECU.

The second valve 232 may employ a check valve configured to allow only the flow of pressure medium flowing to the second hydraulic circuit 202 from the first pressure chamber 112 and configured to block the flow of pressure medium flowing to the opposite direction. That is, the second valve 232 may allow the hydraulic pressure generated in the first pressure chamber 112 to be transmitted to the second hydraulic circuit 202 while preventing the hydraulic pressure of the second hydraulic circuit 202 from being leaked to the first pressure chamber 112 through the third hydraulic flow path 213.

The fourth hydraulic flow path 214 may be communicated with the second pressure chamber 113. The fifth hydraulic flow path 215 may connect the second hydraulic flow path 212 to the first hydraulic circuit 201 and the fourth hydraulic flow path 214. For this, one end of the fifth hydraulic circuit may be connected to the rear end of the first valve 231 on the second hydraulic flow path 212, and the other end of the fifth hydraulic circuit may be connected to the fourth hydraulic flow path 214 and the first hydraulic circuit 201. Opposite ends of sixth hydraulic flow path may be communicated with the rear end of the first and second valves 231 and 232 on the second and third hydraulic flow path 212 and 213 so as to connect the second hydraulic flow path 212 to the third hydraulic flow path 213.

A third valve 233 and a fourth valve 234 configured to control the flow of the pressure medium may be provided on the fourth and sixth hydraulic flow paths 214 and 216, respectively.

The third valve 233 may employ a check valve configured to allow only the flow of pressure medium flowing to the first hydraulic circuit 201 or the fifth hydraulic flow path 215 from the second pressure chamber 113 and configured to block the flow of pressure medium flowing to the opposite direction. That is, the third valve 233 may allow the hydraulic pressure generated in the second pressure chamber 113 to be transmitted to the first hydraulic circuit 201 or the fifth hydraulic flow path 215 while preventing the hydraulic pressure of the first hydraulic circuit 201 or the fifth hydraulic flow path 215 from being leaked to the second pressure chamber 113 through the fourth hydraulic flow path 214.

The fourth valve 234 may employ a two-way valve configured to control the flow of the pressure medium between the second hydraulic flow path 212 and the third hydraulic flow path 213 communicated with opposite ends of the sixth hydraulic flow path 216 while controlling the flow of the pressure medium flowing through the fourth and the fifth hydraulic flow path 214 and 215. The fourth valve 234 may be provided as a normally closed solenoid valve that normally operates to close and operates to open the valve when receiving an electrical signal from the ECU.

By using the above mentioned flow path and valve, the hydraulic pressure generated in the first pressure chamber 112 by the forward movement of the hydraulic piston 114 may be transmitted to the first and second hydraulic circuits 201 and 202. In addition, the hydraulic pressure generated in the second pressure chamber 113 by the backward movement of the hydraulic piston 114 may be transmitted to the first and second hydraulic circuits 201 and 202 through the fourth to the sixth hydraulic flow paths 214, 215 and 216.

Further, since the opposite ends of the sixth hydraulic flow path 216 are communicated with the rear end of the first and second valves 231 and 232 on the second and the third hydraulic flow paths 212 and 213, the fourth valve 234 may be opened when a failure occurs in the first valve 231 or the second valve 232. Therefore, the hydraulic pressure generated in the first pressure chamber 112 may be stably transmitted to the first hydraulic circuit 201 and the second hydraulic circuit 202. On the contrary, it may be possible that the hydraulic pressure generated in the second pressure chamber 113 is controlled to be stably transmitted to the first hydraulic circuit 201 and the second hydraulic circuit 202.

When the first valve 231 and the fourth valve 234 extract the pressure medium from the wheel cylinder 40 to supply the pressure medium to the first pressure chamber 112 to release the hydraulic pressure applied to the wheel cylinder 40, the first valve 231 and the fourth valve 234 may be opened. This is because the second valve 232 provided in the third hydraulic flow path 213 may employ a check valve configured to allow only the flow of the pressure medium in one direction.

Hereinafter, the electric brake system 2 according to the second embodiment of will be described.

Figure 11:
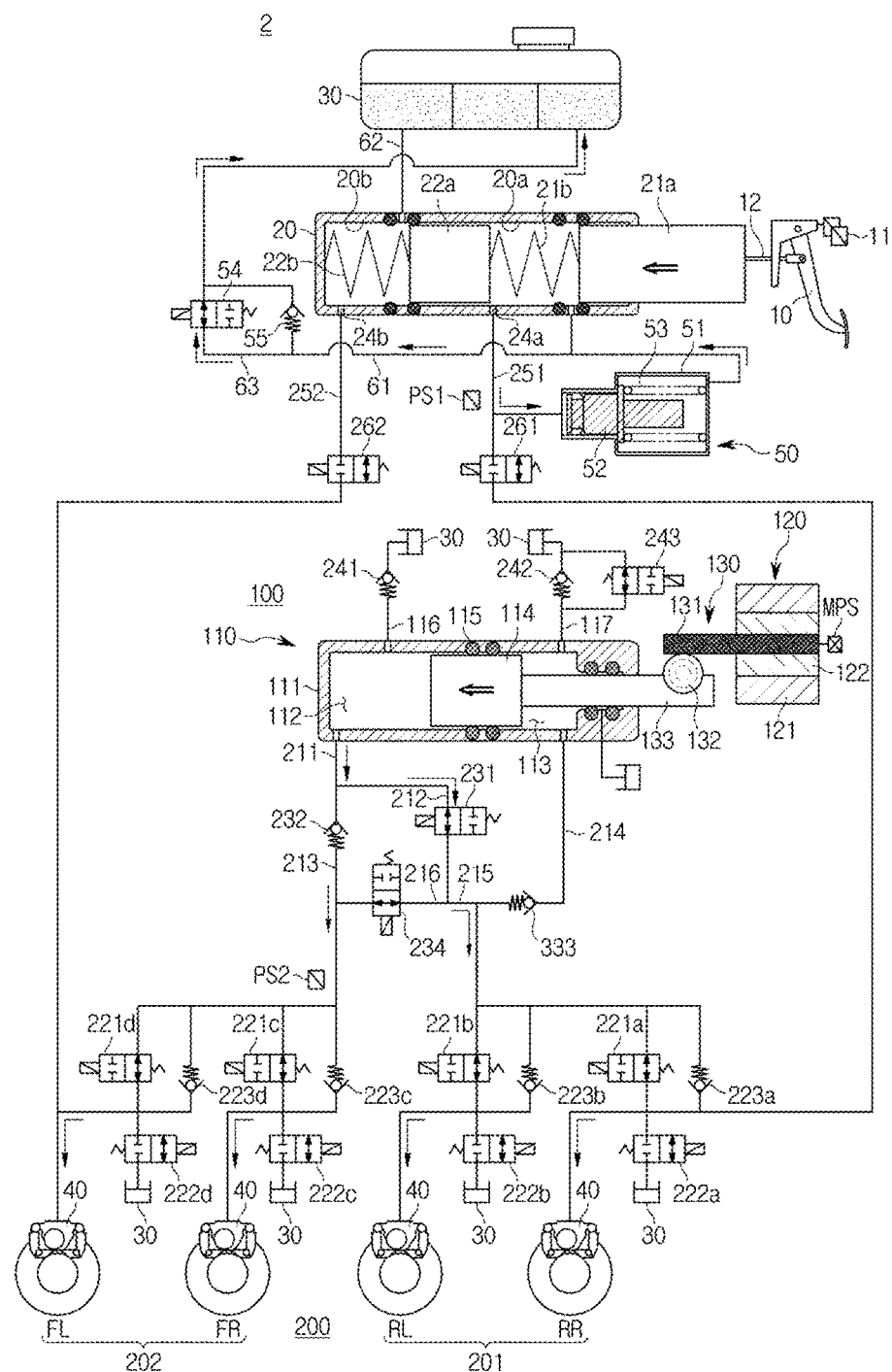
FIG. 11 is a hydraulic circuit diagram illustrating a state in which a hydraulic piston of the electric brake system according to the second embodiment moves forward and provides a braking pressure.
Figure 12:
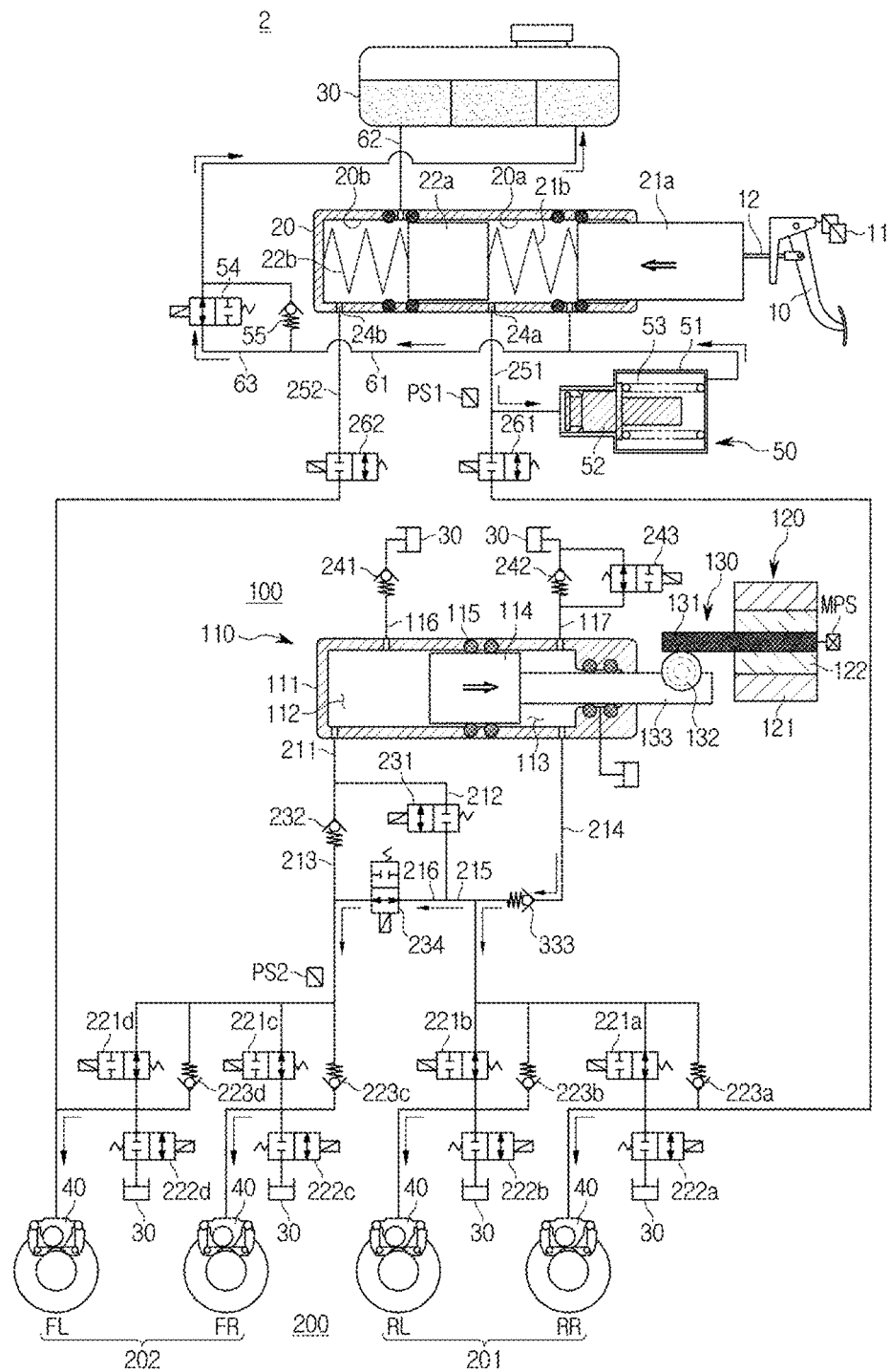
FIG. 12 is a hydraulic circuit diagram illustrating a state in which the hydraulic piston of the electric brake system according to the second embodiment moves backward and provides a braking pressure.

FIG. 11 is a hydraulic circuit diagram illustrating a state in which the hydraulic piston 114 of the electric brake system 2 according to the second embodiment moves forward and provides a braking pressure, and FIG. 12 is a hydraulic circuit diagram illustrating a state in which the hydraulic piston 114 of the electric brake system 2 according to the second embodiment moves backward and provides a braking pressure.

Referring to FIG. 11, when a driver presses the brake pedal 10 to realize the braking, the motor 120 is rotated in one direction and the rotational force of the motor 120 is transmitted to the hydraulic pressure supply unit 110 by the power converter 130. As the hydraulic piston 114 of the hydraulic pressure supply unit 110 moves forward, the hydraulic pressure is generated in the first pressure chamber 112. The hydraulic pressure discharged from the first pressure chamber 112 is transmitted to the wheel cylinders 40 provided on the four wheels through the first hydraulic circuit 201 and the second hydraulic circuit 202 so as to generate the braking force.

Particularly, the hydraulic pressure supplied from the first pressure chamber 112 is directly transmitted to the two wheel cylinders 40 provided in the first hydraulic circuit 201 through the first hydraulic flow path 211, the second hydraulic flow path 212, and the fifth hydraulic flow path 215 connected to the first communication hole 111a. At this time, the first and second inlet valves 221a and 221b, which are installed on two flow paths diverged from the first hydraulic circuit 201, are opened and the first and second outlet valves 222a and 222b, which are installed on a flow path diverged from two flow paths diverged from the first hydraulic circuit 201, are maintained in the closed state. Therefore, it may be possible to prevent the hydraulic pressure from being leaked to the reservoir 30.

In addition, the hydraulic pressure supplied from the first pressure chamber 112 is directly transmitted to the two wheel cylinders 40 provided in the second hydraulic circuit 202 through the first hydraulic flow path 211 and the third hydraulic flow path 213, connected to the first communication hole 111a. At this time, the third and fourth inlet valves 221c and 221d, which are installed on two flow paths diverged from the second hydraulic circuit 202, are opened and the third and fourth outlet valves 222c and 222d, which are installed on a flow path diverged from two flow paths diverged from the second hydraulic circuit 202, are maintained in the closed state. Therefore, it may be possible to prevent the hydraulic pressure from being leaked to the reservoir 30.

Further, since the fourth valve 234 is switched to the open state, the fourth valve 234 may open the sixth hydraulic flow path 216. When the sixth hydraulic flow path 216 is opened, the hydraulic pressure supplied from the first pressure chamber 112 may be transmitted to the second hydraulic circuit 202 after passing through the first hydraulic flow path 211, the second hydraulic flow path 212, and the sixth hydraulic flow path 216, sequentially. In contrast, the hydraulic pressure supplied from the first pressure chamber 112 may be transmitted to the first hydraulic circuit 201 after passing through the first hydraulic flow path 211, the second hydraulic flow path 212, the sixth hydraulic flow path 216 and the fifth hydraulic flow path 215, sequentially.

At this time, the third valve 333 may employ a one-way check valve configured to allow only the flow of the pressure medium flowing to the first hydraulic circuit 201 or the fifth hydraulic flow path 215 from the second pressure chamber 113. Therefore, it may be possible to prevent the hydraulic pressure generated in the first pressure chamber 112 from being transmitted to the second pressure chamber 113 through the fourth hydraulic flow path 214 so as to improve the rate of pressure increase per stroke of the hydraulic piston 114. Accordingly, it may be possible to secure the quick braking response at the early stage of the braking.

In addition, when the hydraulic pressure of the pressure medium is generated by the hydraulic supplier 100, the first and second cut valve 261 and 262 disposed on the first and second the backup flow paths 251 and 252 may be closed, and thus it may be possible to prevent the hydraulic pressure discharged from the master cylinder 20 from being transmitted to the wheel cylinder 40. The hydraulic pressure generated in the master cylinder 20 due to the pedal effort of the brake pedal 10 may be transmitted to the simulator 50 connected to the master cylinder 20. In this time, the simulator valve 54 provided in the first reservoir flow path 61 is opened and the pressure medium discharged from the first master chamber 20a of the master cylinder 20 is transmitted to the front side of the simulation piston 52 so as to move the reaction force piston 52. Therefore, the reaction force spring 53 is compressed and the pressure medium accommodated in the simulation chamber 51 is transmitted to the reservoir 30 through the first reservoir flow path 61 opened by the simulator valve 54. By the elastic restoring force that is generated by the compression of the reaction force spring 53, it may be possible to provide the proper sense of the pedal to the driver by the application of the reaction force corresponding to the pedal effort.

The flow path pressure sensor (PS2) configured to detect the hydraulic pressure of at least one of the first hydraulic circuit 201 and the second hydraulic circuit 202 may detect the hydraulic pressure transmitted to the wheel cylinder 40. Accordingly, the flow path pressure sensor (PS2) may control the amount or the hydraulic pressure of the pressure medium transmitted to the wheel cylinder 40, by controlling the operation of the hydraulic supplier 100. When the hydraulic pressure transmitted to the wheel cylinder 40 is higher than a target pressure value according to the pedal effort of the brake pedal 10, the flow path pressure sensor (PS2) may open at least one of the first to fourth outlet valves 222 to control the hydraulic pressure so that the hydraulic pressure corresponds to the target pressure value.

Hereinafter, an operating state in which the hydraulic piston 114 moves backward to provide the braking pressure to the wheel cylinder 40 will be described.

Referring to FIG. 12, when a driver presses the brake pedal 10 to realize the braking , the motor 120 is rotated in the opposite direction and the rotational force of the motor 120 is transmitted to the hydraulic pressure supply unit 110 by the power converter 130. As the hydraulic piston 114 of the hydraulic pressure supply unit 110 moves backward, the hydraulic pressure is generated in the second pressure chamber 113. The hydraulic pressure discharged from the second pressure chamber 113 is transmitted to the wheel cylinders 40 provided on the four wheels through the first hydraulic circuit 201 and the second hydraulic circuit 202, thereby generating the braking force.

Particularly, the hydraulic pressure supplied from the second pressure chamber 113 is directly transmitted to the wheel cylinders 40 of the first hydraulic circuit 201 through the fourth hydraulic flow path 214 connected to the second communication hole 111b. At this time, the first and second inlet valves 221a and 221b are opened and the first and second outlet valves 222a and 222b are maintained in the closed state. Therefore, it may be possible to prevent the hydraulic pressure from being leaked to the reservoir 30.

In addition, the hydraulic pressure supplied from the second pressure chamber 113 is directly transmitted to the two wheel cylinders 40 of the second hydraulic circuit 202 through the fourth hydraulic flow path 214, the fifth hydraulic flow path 215, and the sixth hydraulic flow path 216 connected to the second communication hole 111b. At this time, the third and fourth inlet valves 221c and 221d are opened and the third and fourth outlet valves 222c and 222d are maintained in the closed state closed. Therefore, it may be possible to prevent the hydraulic pressure from being leaked to the reservoir 30.

At this time, the third valve 333 may employ a one-way check valve configured to allow the flow of the pressure medium flowing to the first hydraulic circuit 201 or the fifth hydraulic flow path 215 from the second pressure chamber 113. Therefore, it may be possible to transmit the pressure medium from the second pressure chamber 113 to the first hydraulic circuit 201 and the fifth hydraulic flow path 215, and since the fourth valve 234 is switched to the open state, the sixth hydraulic flow path 216 may be opened.

Further, since the first valve 231 is maintained in the closes state, the first valve 231 may block the second hydraulic flow path 212. Therefore, it may be possible to prevent the hydraulic pressure generated in the second pressure chamber 113 from being transmitted to the first pressure chamber 112 through the second hydraulic flow path 212 so as to improve the rate of pressure increase per stroke of the hydraulic piston 114. Accordingly, it may be possible to secure the quick braking response at the early stage of the braking.

The third dump valve 243 may be switched to the closed state. Since the third dump valve 243 is closed, the hydraulic pressure of the pressure medium may be rapidly and stably generated in the second pressure chamber 113, and the hydraulic pressure generated in the second pressure chamber 113 may be discharged to only the fourth hydraulic flow path 214.

Hereinafter, an electric brake system 3 according to a third embodiment of will be described.

In the following description of the electric brake system 3 according to the third embodiment, except for an additional description with a different reference numeral, a description of the same parts as those shown in the electric brake systems 1 and 2 according to the first and second embodiment will be omitted to prevent duplication.

Figure 13:
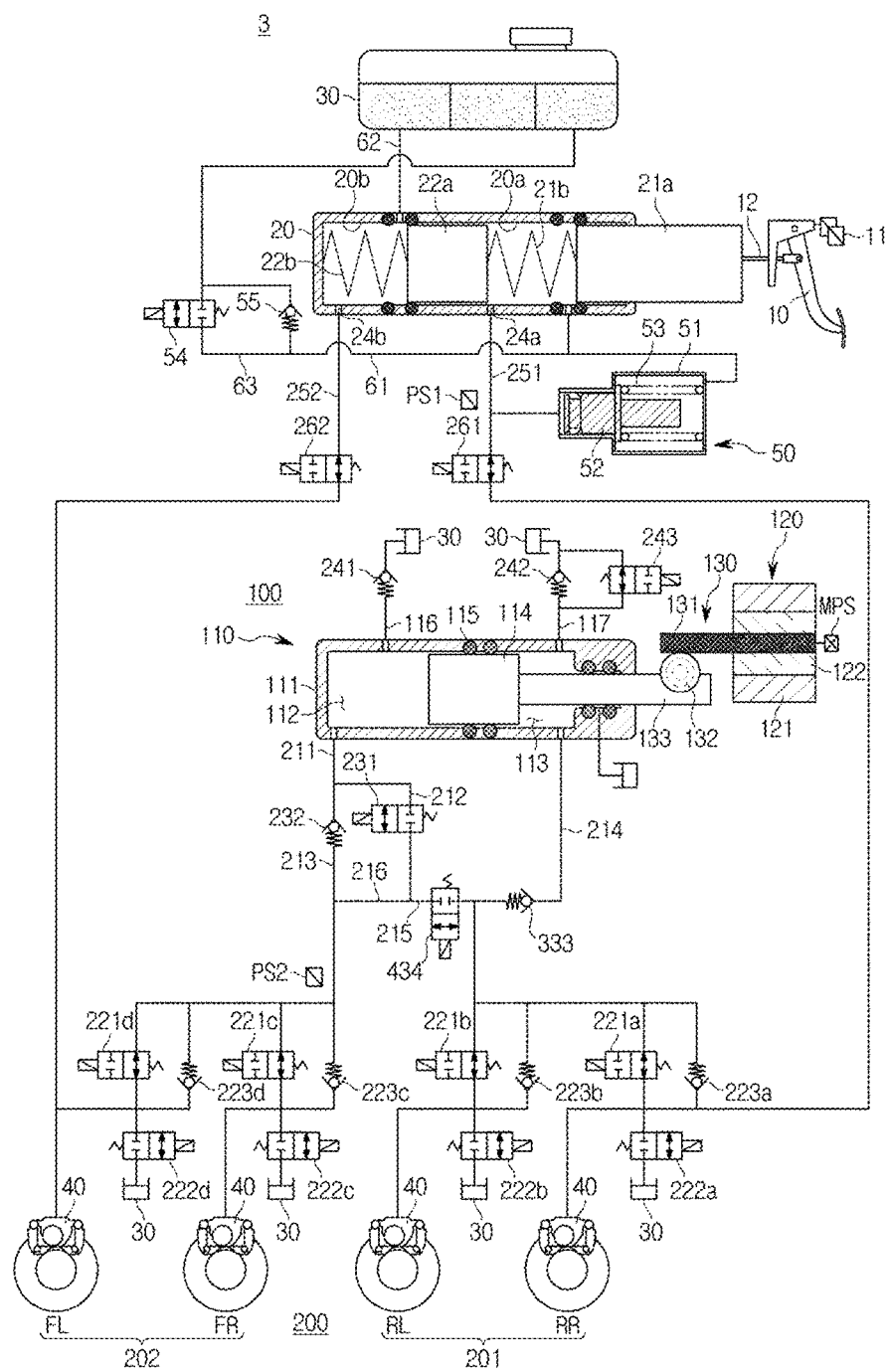
FIG. 13 is a hydraulic circuit diagram illustrating an electric brake system according to a third embodiment.

FIG. 13 is a hydraulic circuit diagram illustrating the electric brake system 3 according to the third embodiment.

Referring to FIG. 13, according to the third embodiment, a first hydraulic flow path 211 of the electric brake system 3 may connect a first pressure chamber 112 to first and second hydraulic circuits 201 and 202. The first hydraulic flow path 211 may be branched into a second hydraulic flow path 212 and a third hydraulic flow path 213. The third hydraulic flow path 213 may be connected to the second hydraulic circuit 202. Therefore, the hydraulic pressure generated in the first pressure chamber 112 by the forward movement of the hydraulic piston 114 may be transmitted to the second hydraulic circuit 202 through the first hydraulic flow path 211 and the third hydraulic flow path 213. The hydraulic pressure may be transmitted to the first hydraulic circuit 201 through the first hydraulic flow path 211, the second hydraulic flow path 212, and a fifth hydraulic flow path 215 described later.

A first valve 231 and a second valve 232 configured to control the flow of the pressure medium may be provided on the second hydraulic flow path 212 and the third hydraulic flow path 213, respectively.

The first valve 231 may employ a two-way valve configured to control the flow of the pressure medium transmitted through the second hydraulic flow path 212. The first valve 231 may be provided as a normally closed solenoid valve that normally operates to close and operates to open the valve when receiving an electrical signal from the ECU.

The second valve 232 may employ a check valve configured to allow only the flow of pressure medium flowing to the second hydraulic circuit 202 from the first pressure chamber 112 and configured to block the flow of pressure medium flowing to the opposite direction. That is, the second valve 232 may allow the hydraulic pressure generated in the first pressure chamber 112 to be transmitted to the second hydraulic circuit 202 while preventing the hydraulic pressure of the second hydraulic circuit 202 from being leaked to the first pressure chamber 112 through the third hydraulic flow path 213.

The fourth hydraulic flow path 214 may be communicated with the first pressure chamber 112. The fifth hydraulic flow path 215 may connect the second hydraulic flow path 212 to the first hydraulic circuit 201 and the fourth hydraulic flow path 214. For this, one end of the fifth hydraulic circuit 215 may be connected to the rear end of the first valve 231 on the second hydraulic flow path 212, and the other end of the fifth hydraulic circuit may be connected to the fourth hydraulic flow path 214 and the first hydraulic circuit 201. Opposite ends of sixth hydraulic flow path 216 may be communicated with the rear end of the first and second valves 231 and 232 on the second and third hydraulic flow path 212 and 213 so as to connect the second hydraulic flow path 212 to the third hydraulic flow path 213.

A third valve 333 and a fourth valve 434 configured to control the flow of the pressure medium may be provided on the fourth and fifth hydraulic flow paths 214 and 215, respectively.

The third valve 333 may employ a check valve configured to allow the flow of pressure medium flowing to the first hydraulic circuit 201 or the fifth hydraulic flow path 215 from the second pressure chamber 113 and configured to block the flow of pressure medium flowing to the opposite direction. That is, the third valve 333 may allow the hydraulic pressure generated in the second pressure chamber 113 to be transmitted to the first hydraulic circuit 201 or the fifth hydraulic flow path 215 while preventing the hydraulic pressure of the first hydraulic circuit 201 or the fifth hydraulic flow path 215 from being leaked to the second pressure chamber 113 through the fourth hydraulic flow path 214.

The fourth valve 434 may employ a two-way valve configured to control the flow of the pressure medium transmitted through the fifth hydraulic flow path 215. The fourth valve 434 may be provided as a normally closed solenoid valve that normally operates to close and operates to open the valve when receiving an electrical signal from the ECU.

By using the above mentioned flow path and valve, the hydraulic pressure generated in the first pressure chamber 112 by the forward movement of the hydraulic piston 114 may be transmitted to the first and second hydraulic circuits 201 and 202. In addition, the hydraulic pressure generated in the second pressure chamber 113 by the backward movement of the hydraulic piston 114 may be transmitted to the first and second hydraulic circuits 201 and 202 through the fourth to the sixth hydraulic flow paths 214, 215 and 216.

Further, since the opposite ends of the sixth hydraulic flow path 216 are communicated with the rear end of the first and second valves 231 and 232 on the second and the third hydraulic flow paths 212 and 213, the fourth valve 434 may be opened when a failure occurs in the first valve 231 or the second valve 232. Therefore, the hydraulic pressure generated in the first pressure chamber 112 may be stably transmitted to the first hydraulic circuit 201 and the second hydraulic circuit 202. On the contrary, it may be possible that the hydraulic pressure generated in the second pressure chamber 113 is controlled to be stably transmitted to the first hydraulic circuit 201 and the second hydraulic circuit 202.

Hereinafter, the electric brake system 3 according to the third embodiment of will be described.

Figure 14:
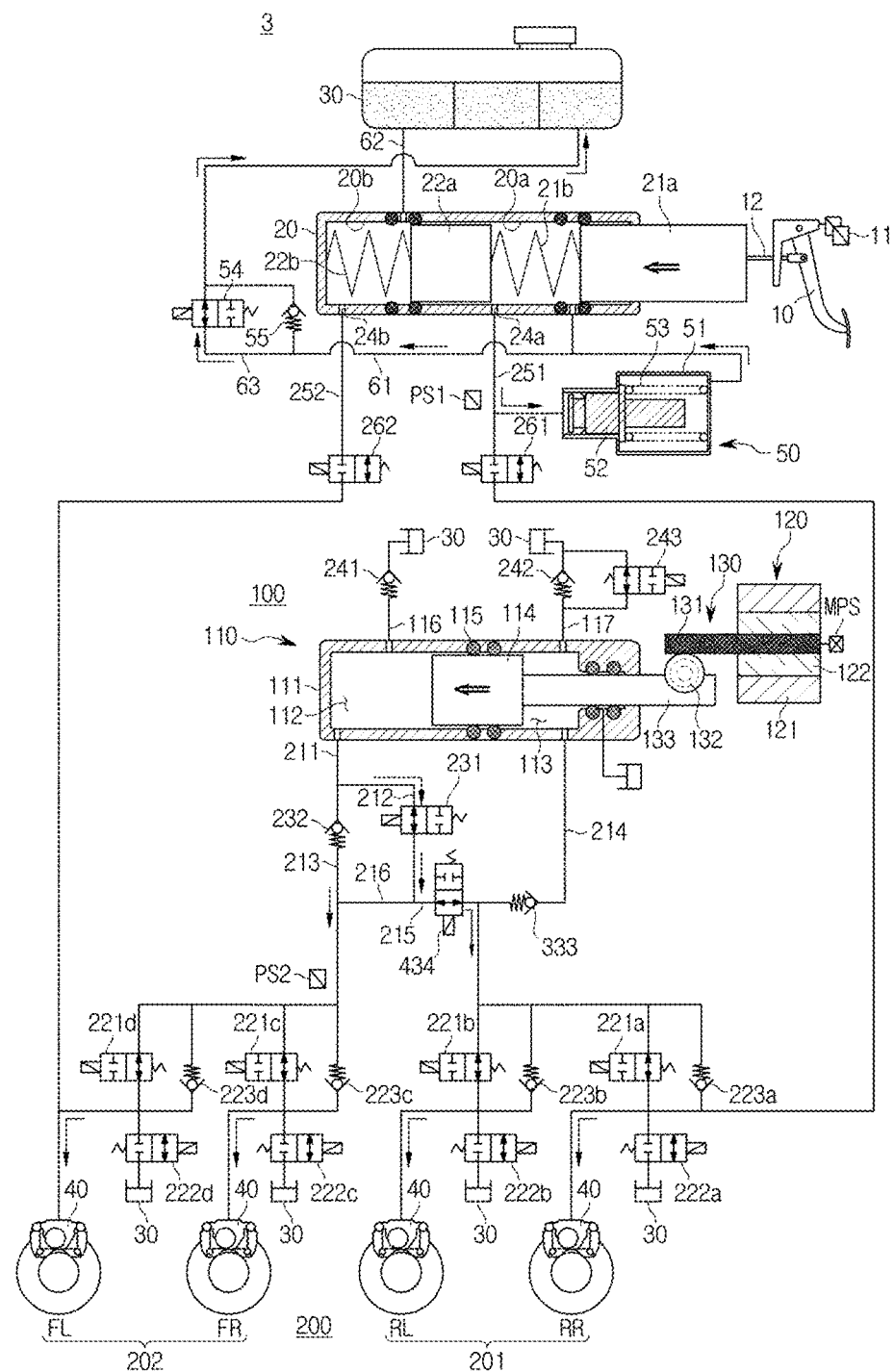
FIG. 14 is a hydraulic circuit diagram illustrating a state in which a hydraulic piston of the electric brake system according to the third embodiment moves forward and provides a braking pressure.
Figure 15:
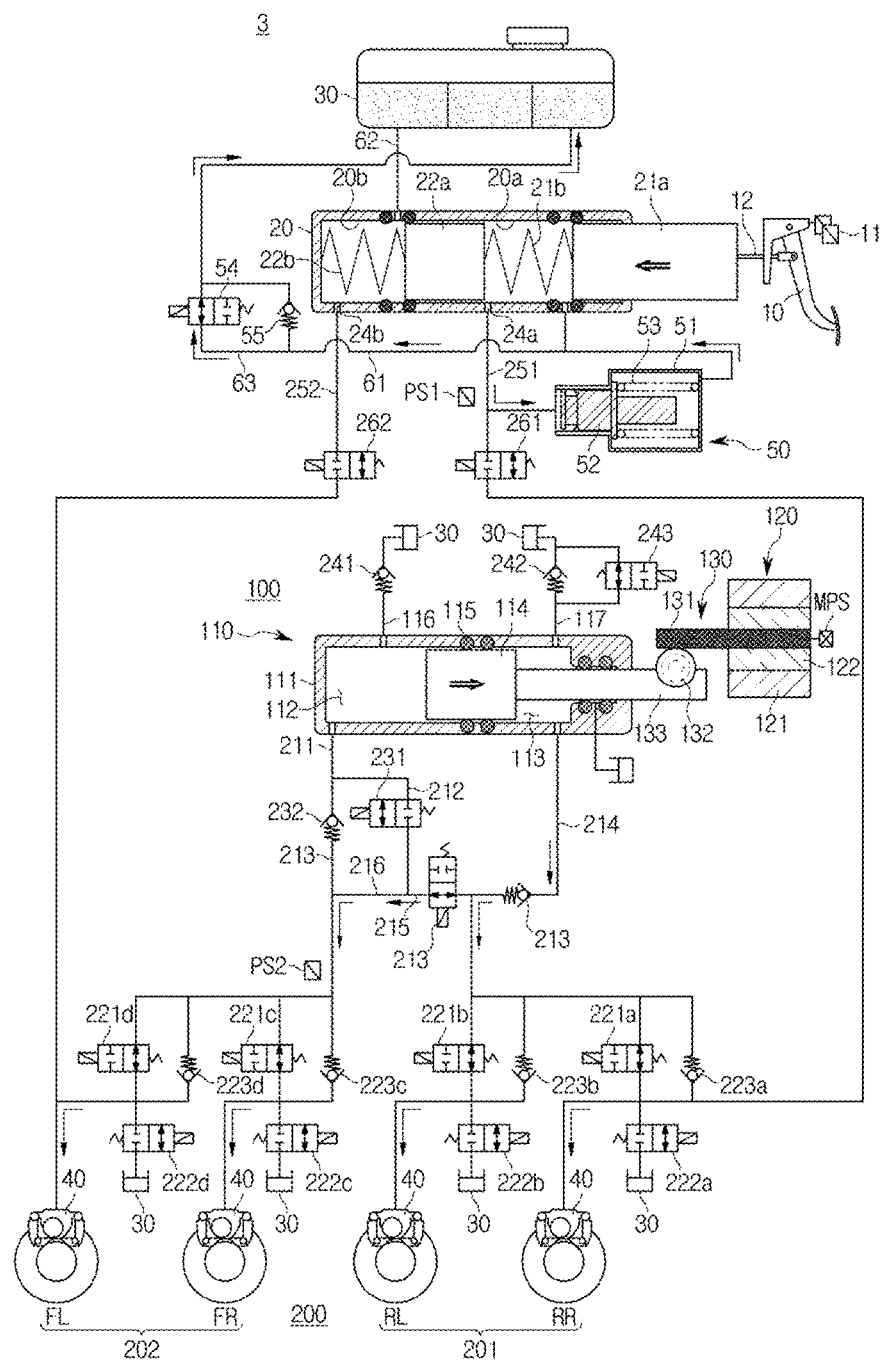
FIG. 15 is a hydraulic circuit diagram illustrating a state in which the hydraulic piston of the electric brake system according to the third embodiment moves backward and provides a braking pressure.

FIG. 14 is a hydraulic circuit diagram illustrating a state in which a hydraulic piston 114 of the electric brake system 3 according to the third embodiment moves forward and provides a braking pressure and FIG. 15 is a hydraulic circuit diagram illustrating a state in which the hydraulic piston 114 of the electric brake system 3 according to the third embodiment moves backward and provides a braking pressure Referring to FIG. 14, when a driver presses the brake pedal 10 to realize the braking, the motor 120 is rotated in one direction and the rotational force of the motor 120 is transmitted to the hydraulic pressure supply unit 110 by the power converter 130. As the hydraulic piston 114 of the hydraulic pressure supply unit 110 moves forward, the hydraulic pressure is generated in the first pressure chamber 112. The hydraulic pressure discharged from the first pressure chamber 112 is transmitted to the wheel cylinders 40 provided on the four wheels through the first hydraulic circuit 201 and the second hydraulic circuit 202, thereby generating the braking force.

Particularly, the hydraulic pressure supplied from the first pressure chamber 112 is directly transmitted to the two wheel cylinders 40 provided in the first hydraulic circuit 201 through the first hydraulic flow path 211, the second hydraulic flow path 212, and the fifth hydraulic flow path 215 connected to the first communication hole 111a. At this time, the first and second inlet valves 221a and 221b, which are installed on two flow paths diverged from the first hydraulic circuit 201, are opened and the first and second outlet valves 222a and 222b, which are installed on a flow path diverged from two flow paths diverged from the first hydraulic circuit 201, are maintained in the closed state. Therefore, it may be possible to prevent the hydraulic pressure from being leaked to the reservoir 30.

In addition, the hydraulic pressure supplied from the first pressure chamber 112 is directly transmitted to the two wheel cylinders 40 provided in the second hydraulic circuit 202 through the first hydraulic flow path 211 and the third hydraulic flow path 213, connected to the first communication hole 111a. At this time, the third and fourth inlet valves 221c and 221d, which are installed on two flow paths diverged from the second hydraulic circuit 202, are opened and the third and fourth outlet valves 222c and 222d, which are installed on a flow path diverged from two flow paths diverged from the second hydraulic circuit 202, are maintained in the closed state. Therefore, it may be possible to prevent the hydraulic pressure from being leaked to the reservoir 30.

At this time, since the fourth valve 434 is switched to the open state, the fourth valve 434 may open the fifth hydraulic flow path 215. When the fifth hydraulic flow path 215 is opened, the hydraulic pressure supplied from the first pressure chamber 112 may be transmitted to the first hydraulic circuit 201 after passing through the first hydraulic flow path 211, the second hydraulic flow path 212, and the fifth hydraulic flow path 215, sequentially. In addition, the hydraulic pressure supplied from the first pressure chamber 112 may be transmitted to the first hydraulic circuit 201 after passing through the first hydraulic flow path 211, the third hydraulic flow path 213, the sixth hydraulic flow path 216 and the fifth hydraulic flow path 215, sequentially. On the contrary, the hydraulic pressure supplied from the first pressure chamber 112 may be transmitted to the second hydraulic circuit 202 after passing through the first hydraulic flow path 211, the second hydraulic flow path 212, and the sixth hydraulic flow path 216, sequentially.

At this time, the third valve 333 may employ a one-way check valve configured to allow only the flow of the pressure medium flowing to the first hydraulic circuit 201 or the fifth hydraulic flow path 215 from the second pressure chamber 113.

Therefore, it may be possible to prevent the hydraulic pressure generated in the first pressure chamber 112 from being transmitted to the second pressure chamber 113 through the fourth hydraulic flow path 214 so as to improve the rate of pressure increase per stroke of the hydraulic piston 114. Accordingly, it may be possible to secure the quick braking response at the early stage of the braking.

Hereinafter, an operating state in which the hydraulic piston 114 moves backward to provide the braking pressure to the wheel cylinder 40 will be described.

Referring to FIG. 15, when a driver presses the brake pedal 10 to realize the braking , the motor 120 is rotated in the opposite direction and the rotational force of the motor 120 is transmitted to the hydraulic pressure supply unit 110 by the power converter 130. As the hydraulic piston 114 of the hydraulic pressure supply unit 110 moves backward, the hydraulic pressure is generated in the second pressure chamber 113. The hydraulic pressure discharged from the second pressure chamber 113 is transmitted to the wheel cylinders 40 provided on the four wheels through the first hydraulic circuit 201 and the second hydraulic circuit 202, thereby generating the braking force.

Particularly, the hydraulic pressure supplied from the second pressure chamber 113 is directly transmitted to the wheel cylinders 40 of the first hydraulic circuit 201 through the fourth hydraulic flow path 214 connected to the second communication hole 111b. At this time, the first and second inlet valves 221a and 221b are opened and the first and second outlet valves 222a and 222b are maintained in the closes state. Therefore, it may be possible to prevent the hydraulic pressure from being leaked to the reservoir 30.

In addition, the hydraulic pressure supplied from the second pressure chamber 113 is directly transmitted to the two wheel cylinders 40 of the second hydraulic circuit 202 through the fourth hydraulic flow path 214, the fifth hydraulic flow path 215, and the sixth hydraulic flow path 216 connected to the second communication hole 111b. At this time, the third and fourth inlet valves 221c and 221d are opened and the third and fourth outlet valves 222c and 222d are maintained in the closed state. Therefore, it may be possible to prevent the hydraulic pressure from being leaked to the reservoir 30.

At this time, the third valve 333 may employ a one-way check valve configured to allow the flow of the pressure medium flowing to the first hydraulic circuit 201 or the fifth hydraulic flow path 215 from the second pressure chamber 113. Therefore, it may be possible to transmit the pressure medium from the second pressure chamber 113 to the first hydraulic circuit 201 and the fifth hydraulic flow path 215, and since the fourth valve 434 is switched to the open state, the fifth hydraulic flow path 215 may be opened.

Further, since the first valve 231 is maintained in the closes state, the first valve 231 may block the second hydraulic flow path 212. Therefore, it may be possible to prevent the hydraulic pressure generated in the second pressure chamber 113 from being leaked to the first pressure chamber 112 through the second hydraulic flow path 212 so as to improve the rate of pressure increase per stroke of the hydraulic piston 114. Accordingly, it may be possible to secure the quick braking response at the early stage of the braking.

The third dump valve 243 may be switched to the closed state. Since the third dump valve 243 is closed, the hydraulic pressure of the pressure medium may be rapidly and stably generated in the second pressure chamber 113, and the hydraulic pressure generated in the second pressure chamber 113 may be discharged to only the fourth hydraulic flow path 214.

As is apparent from the above description, the electric brake system and the operating method thereof stably and effectively provide the braking in various operating conditions of the vehicle.

The electric brake system and the operating method thereof reduce the size and the weight of the product by having a simple structure and reducing the number of valves.

The electric brake system and the operating method thereof have an improved performance and operational reliability.

The electric brake system and the operating method thereof provide the stable braking effect even when a component thereof fails or the pressure medium is leaked.

The electric brake system and the operating method thereof improve the product productivity while reducing the cost of the product.

Although a few embodiments of the present disclosure have been shown and described, it would be appreciated by those skilled in the art that changes may be made in these embodiments without departing from the principles and spirit of the disclosure, the scope of which is defined in the claims and their equivalents.

DESCRIPTION OF SYMBOLS

10: brake pedal 11: pedal displacement sensor
20: master cylinder 30: reservoir
40: wheel cylinder 50: simulator
54: simulator valve 61, 62: reservoir flow path
100: hydraulic supplier 110: hydraulic pressure supply unit
120: motor 130: power converter
200, 300, 400, 500 : hydraulic control unit
201: first hydraulic circuit 202: second hydraulic circuit
211, 511: first hydraulic flow path 212, 512: second hydraulic flow path
213, 513: third hydraulic flow path 214, 514: fourth hydraulic flow path
215, 515: fifth hydraulic flow path 216, 516: sixth hydraulic flow path
517: seventh hydraulic flow path 518: eighth hydraulic flow path
221: inlet valve 222: outlet valve
231: first valve 232: second valve
233, 333: third valve 234, 434: fourth valve
241: first dump valve 242: second dump valve
243: third dump valve 251: first backup flow path
252: second backup flow path 261: first cut valve
262: second cut valve

What is claimed is:

1. An electric brake system comprising:
a hydraulic supplier configured to generate hydraulic pressure by operating a hydraulic piston by an electrical signal, which is output corresponding to a displacement of a brake pedal, and provided with a first pressure chamber provided on one side of the hydraulic piston movably accommodated in a cylinder block and a second pressure chamber provided on the other side of the hydraulic piston;
a hydraulic control unit provided with a first hydraulic circuit configured to control hydraulic pressure transmitted to two wheel cylinders, and a second hydraulic circuit configured to control hydraulic pressure transmitted to other two wheel cylinders;
a reservoir configured to store pressure medium;
a master cylinder configured to discharge hydraulic pressure according to the displacement of the brake pedal;
a simulator comprising a simulation chamber and configured to provide reaction force against pedal effort of the brake pedal;
a reservoir flow path configured to communicate between the reservoir, the master cylinder, and the simulator;

a simulator check valve disposed on the reservoir flow path to allow only flow of pressure medium flowing from the reservoir to the master cylinder and the simulator; and a simulator valve connected with the simulator check valve in parallel and disposed on the reservoir flow path to control the flow of the pressure medium between the reservoir, and the master cylinder and the simulator, wherein the hydraulic control unit comprises a first hydraulic flow path communicated with the first pressure chamber, a second hydraulic flow path diverged from the first hydraulic flow path, a third hydraulic flow path diverged from the first hydraulic flow path and then connected to the second hydraulic circuit, a fourth hydraulic flow path communicated with the second pressure chamber and connected to the first hydraulic circuit, a fifth hydraulic flow path configured to connect the second hydraulic flow path to the first hydraulic circuit and the fourth hydraulic flow path, and a sixth hydraulic flow path configured to connect the second hydraulic flow path to the third hydraulic flow path.

2. The electric brake system of claim 1, wherein the hydraulic control unit comprises a first valve disposed on the second hydraulic flow path to control a flow of pressure medium, a second valve disposed on the third hydraulic flow path to control a flow of pressure medium, a third valve disposed on the fourth hydraulic flow path to control a flow of pressure medium, and a fourth valve disposed on the sixth hydraulic flow path to control a flow of pressure medium.

3. The electric brake system of claim 2, wherein the first, third and. fourth valves are provided as a solenoid valve configured to control the flow of the pressure medium in two ways, and the second valve is provided as a check valve configured to allow only the flow of the pressure medium flowing to the second hydraulic circuit from the first pressure chamber.

4. The electric brake system of claim 1, wherein:

the master cylinder comprises a master chamber and a master piston displaceable by an operation of the brake pedal to compress and discharge the pressure medium accommodated in the master chamber according to a displacement;

the simulator comprises a simulation piston displaceable by the pressure medium discharged from the master chamber to compress and discharge the pressure medium accommodated in the simulation chamber according to a displacement; and the simulator valve is disposed on a bypass flow path to control the flow of the pressure medium in two ways.

5. The electric brake system of claim 1, wherein the master piston comprises a first master piston directly pressed by the brake pedal, and a second master piston indirectly pressed by the first master piston, wherein the master chamber comprises a first master chamber in which the first master piston is placed, and a second master chamber in which the second master piston is placed, wherein the simulation piston is configured to be displaceable by the pressure medium compressed and discharged from the first maser chamber, and the reservoir flow path communicates among the first master chamber, the simulation chamber and the reservoir.

6. The electric brake system of claim 5, wherein the simulator further comprises a reaction force spring configured to elastically support the simulation piston.

7. The electric brake system of claim 6, further comprising:

a first dump flow path configured to connect the first pressure chamber to the reservoir;

a second dump flow path configured to connect the second pressure chamber to the reservoir;

a first dump valve disposed on the first dump flow path to control the flow of the pressure medium, and provided as a check valve configured to allow only the flow of the pressure medium flowing into the first pressure chamber from the reservoir;

a second dump valve disposed on the second dump flow path to control the flow of the pressure medium, and provided as a check valve configured to allow only the flow of the pressure medium flowing into the second pressure chamber from the reservoir; and a third dump valve disposed on a bypass flow path in parallel with the second dump valve on the second dump flow path to control the flow of the pressure, and provided as a solenoid valve configured to control the flow of the pressure medium in two ways between the reservoir and the second pressure chamber.

8. The electric brake system of claim 7, further comprising:

a first backup flow path configured to connects the first master chamber to the first hydraulic circuit;

a second backup flow path configured to connects the second master chamber to the second hydraulic circuit;

a first cut valve provided in the first backup flow path to control the flow of the pressure medium; and a second cut valve provided in the second backup flow path to control the flow of the pressure medium.

9. The electric brake system of claim 2, wherein the first and fourth valves are provided as a solenoid valve configured to control the flow of the pressure medium in two ways, the second valve is provided as a check valve configured to allow only the flow of the pressure medium flowing to the second hydraulic circuit from the first pressure chamber; and the third valve is provided as a check valve configured to allow only the flow of the pressure medium flowing to the first hydraulic circuit or the fifth hydraulic flow path from the second pressure chamber.

10. The electric brake system of claim 1, wherein the hydraulic control unit comprises a first valve disposed on the second hydraulic flow path to control a flow of pressure medium, a second valve disposed on the third hydraulic flow path to control a flow of pressure medium, a third valve disposed on the fourth hydraulic flow path to control a flow of pressure medium, and a fourth valve disposed on the fifth hydraulic flow path to control a flow of pressure medium.

11. The electric brake system of claim 10, wherein the first and fourth valves are provided as a solenoid valve configured to control the flow of the pressure medium in two ways, the second valve is provided as a check valve configured to allow only the flow of the pressure medium flowing to the second hydraulic circuit from the first pressure chamber; and the third valve is provided as a check valve configured to allow only the flow of the pressure medium flowing to the first hydraulic circuit or the fifth hydraulic flow path from the second pressure chamber.

12. An operating method of the electric brake system of claim 3, wherein
a normal operation mode comprises sequentially performing a low pressure mode providing a relatively low hydraulic pressure and a high pressure mode providing a relatively high hydraulic pressure, according to a hydraulic level transmitted to the wheel cylinder from the hydraulic supplier.

13. The operating method of claim 12, wherein
the low pressure mode comprising
opening the first and. fourth valves; and
providing hydraulic pressure, which is generated in the first pressure chamber by the forward movement of the hydraulic piston, to the first hydraulic circuit and the second hydraulic circuit.

14. The operating method of claim 13, wherein
the high pressure mode comprising
opening the first and fourth valves;
providing some of hydraulic pressure, which is generated in the first pressure chamber by the forward movement of the hydraulic piston, to the first hydraulic circuit and the second hydraulic circuit after the low pressure mode;
opening the third valve;
providing some of the remaining hydraulic pressure, which is generated n the first pressure chamber, to the second hydraulic circuit.

15. The operating method of claim 13, wherein
a release of the low pressure mode comprising
opening the first and fourth valves; and
allowing the pressure medium of the first hydraulic circuit and the second hydraulic circuit to he collected to the first pressure chamber by generating a negative pressure in the first pressure chamber by the backward movement of the hydraulic piston.

16. The operating method of claim 14, wherein
a release of the high pressure mode comprising
opening the first and fourth valves;
allowing the pressure medium of the first hydraulic circuit and the second. hydraulic circuit to be collected to the first pressure chamber by generating a negative pressure in the first pressure chamber by the backward movement of the hydraulic piston;
opening the third valve; and
supplying the pressure medium of the second pressure chamber to the first pressure chamber.

17. The operating method of claim 8, wherein
an abnormal operation mode comprises
communicating the first master chamber with the first hydraulic circuit by opening the first cut valve; and
communicating the second master chamber with the second hydraulic circuit by opening the second cut valve.

18. The operating method of claim 5, wherein
a normal operation mode comprises
opening the simulator valve,
generating a displacement of the simulation piston by the pressure medium discharged from the first master chamber; and
supplying the pressure medium accommodated in the simulation chamber to the reservoir along the reservoir flow path.

19. The operating method of claim 8, wherein
an inspection mode configured to identify the presence of a leakage in the master cylinder or the simulator valve comprises
closing the simulator valve and the second cut valve and opening the first cut valve;
providing hydraulic pressure, which is generated by operating the hydraulic supplier, to the first master chamber; and
comparing a hydraulic pressure value of the pressure medium estimated based on displacement amount of the hydraulic piston, with a hydraulic pressure value of the pressure medium supplied to the first master chamber.

20. The electric brake system of claim 1, further comprising:
a first backup flow path connecting the master cylinder to between at least one of the two wheel cylinders and a first inlet valve included in the first hydraulic circuit so that hydraulic pressure of the master cylinder is directly transmitted to the at least one of the two wheel cylinders; and
a second backup flow path connecting the master cylinder to between at least one of the other two wheel cylinders and a second inlet valve included in the second hydraulic circuit so that the hydraulic pressure of the master cylinder is directly transmitted to the at least one of the other two wheel cylinders.

* * * * *